US010264911B2

(12) United States Patent
McLean et al.

(10) Patent No.: US 10,264,911 B2
(45) Date of Patent: Apr. 23, 2019

(54) PRESS FOR EXTRACTING AN INFUSION

(71) Applicant: ESPRO, INC., Vancouver (CA)

(72) Inventors: Christopher R. McLean, Vancouver (CA); Bruce A. Constantine, North Attleboro, MA (US)

(73) Assignee: Espro, Inc., Vancouver, British Columbia (CA)

( * ) Notice: Subject to any disclaimer, the term of this patent is extended or adjusted under 35 U.S.C. 154(b) by 0 days.

(21) Appl. No.: 14/821,434

(22) Filed: Aug. 7, 2015

(65) Prior Publication Data

US 2016/0037960 A1    Feb. 11, 2016

Related U.S. Application Data

(60) Provisional application No. 62/034,441, filed on Aug. 7, 2014.

(51) Int. Cl.
*A47J 31/20* (2006.01)
*A47J 31/18* (2006.01)

(52) U.S. Cl.
CPC ............. *A47J 31/20* (2013.01); *A47J 31/18* (2013.01)

(58) Field of Classification Search
CPC ............. A47J 31/18; A47J 31/38; A47J 31/20
USPC .................... 99/279, 297, 316–319
See application file for complete search history.

(56) References Cited

U.S. PATENT DOCUMENTS

| | | |
|---|---|---|
| 1,025,206 A | 5/1912 | Rounds |
| 1,581,877 A | 4/1926 | Schultz |
| 1,954,064 A | 4/1934 | Blitz |
| 2,299,918 A | 10/1942 | Mollenkamp |
| 2,468,661 A | 4/1949 | Gladstone |
| 2,516,703 A | 7/1950 | Kent |
| 2,592,485 A | 4/1952 | Stair |
| 2,793,790 A | 5/1957 | Kahler |
| 3,158,084 A | 11/1964 | Cohn |

(Continued)

FOREIGN PATENT DOCUMENTS

| | | |
|---|---|---|
| CA | 1019251 A1 | 10/1977 |
| CA | 2418741 A1 | 8/2004 |

(Continued)

OTHER PUBLICATIONS

USPTO communication dated Aug. 17, 2017, received in a copending patent application of the Applicant (Espro, Inc.), U.S. Appl. No. 15/227,241. Third-Party Submission under 37 CFR 1.290 (filed Aug. 14, 2017), 27 sheets.

(Continued)

*Primary Examiner* — Dana Ross
*Assistant Examiner* — Joseph Iskra
(74) *Attorney, Agent, or Firm* — Crawford Maunu PLLC

(57) ABSTRACT

An infusion extractor is provided including a plunger to be inserted into an infusing container containing the infusion mixture that has vertical inner walls oriented parallel to a vertical axis of the container. The plunger includes a first surface with a seal situated at an edge of the surface. The seal is adapted for sealing against the inner walls of the infusing container as the plunger moves within the container. The plunger also includes a second surface extending from the first surface and defining a second chamber. At least a portion of the extract flow openings are situated at a depth either above or below the first surface along the vertical axis.

4 Claims, 29 Drawing Sheets

(56) References Cited

U.S. PATENT DOCUMENTS

| | | | |
|---|---|---|---|
| 3,260,510 | A | 7/1966 | Ranson |
| 3,279,351 | A * | 10/1966 | Cohn ..................... A47J 31/20 99/282 |
| 3,561,888 | A | 2/1971 | Jordan |
| 3,589,683 | A | 6/1971 | Robin |
| 3,657,993 | A | 4/1972 | Close |
| 3,927,608 | A * | 12/1975 | Doyel ..................... A47J 31/20 99/287 |
| 3,935,318 | A | 1/1976 | Mihailide |
| 4,066,722 | A | 1/1978 | Pietruszewski et al. |
| 4,602,558 | A | 7/1986 | Kaper et al. |
| 4,645,132 | A | 2/1987 | Fregnan |
| 4,650,583 | A | 3/1987 | Bondanini |
| 4,804,550 | A | 2/1989 | Bardsley et al. |
| 4,852,474 | A | 8/1989 | Malich et al. |
| 4,945,824 | A | 8/1990 | Borgmann |
| 4,950,082 | A | 8/1990 | Carlson |
| 5,106,239 | A | 4/1992 | Krebsbach |
| 5,141,134 | A | 8/1992 | Machado |
| 5,174,194 | A | 12/1992 | Piana |
| D348,590 | S | 7/1994 | Scott |
| 5,335,588 | A | 8/1994 | Mahlich |
| 5,464,574 | A | 11/1995 | Mahlich |
| 5,472,274 | A | 12/1995 | Baillie |
| 5,478,586 | A * | 12/1995 | Connor ................... A47J 31/20 426/431 |
| 5,487,486 | A | 1/1996 | Meneo |
| 5,526,733 | A | 6/1996 | Klawuhn et al. |
| 5,544,566 | A * | 8/1996 | Bersten ................... A47J 31/20 99/287 |
| D375,233 | S | 11/1996 | Hirsch |
| 5,618,570 | A | 4/1997 | Banks et al. |
| 5,622,099 | A | 4/1997 | Frei |
| 5,635,233 | A * | 6/1997 | Levinson .................. A23F 3/18 426/433 |
| 5,636,563 | A | 6/1997 | Oppermann et al. |
| 5,638,740 | A | 6/1997 | Cai |
| D384,539 | S | 10/1997 | Joergensen |
| 5,770,074 | A | 6/1998 | Pugh |
| 5,788,369 | A | 8/1998 | Tseng |
| D401,466 | S | 11/1998 | Joergensen |
| D405,642 | S | 2/1999 | Toriba |
| 5,887,510 | A * | 3/1999 | Porter ..................... A47J 31/20 99/287 |
| D410,170 | S | 5/1999 | Sheu |
| 5,911,810 | A | 6/1999 | Kawabata |
| 5,913,964 | A | 6/1999 | Melton |
| 5,932,098 | A | 8/1999 | Ross |
| D413,480 | S | 9/1999 | Joergensen |
| 6,095,032 | A | 8/2000 | Barnett et al. |
| D435,195 | S | 12/2000 | Joergensen |
| 6,220,147 | B1 | 4/2001 | Priley |
| D448,601 | S | 10/2001 | Yeh |
| D448,602 | S | 10/2001 | Bodum |
| D448,603 | S | 10/2001 | Yeh |
| D449,760 | S | 10/2001 | Yeh |
| 6,296,884 | B1 | 10/2001 | Okerlund |
| D450,223 | S | 11/2001 | Joergensen |
| 6,324,966 | B1 | 12/2001 | Joergensen |
| D457,377 | S | 5/2002 | Jorgensen |
| 6,382,083 | B2 | 5/2002 | Schmed |
| 6,412,394 | B2 | 7/2002 | Bonanno |
| D462,233 | S | 9/2002 | Jorgensen |
| D453,446 | S | 12/2002 | Bodum |
| D468,597 | S | 1/2003 | Kerr |
| 6,736,295 | B2 | 5/2004 | Lin et al. |
| D493,662 | S | 8/2004 | Bodum |
| D494,803 | S | 8/2004 | Bodum |
| 6,797,160 | B2 | 9/2004 | Huang |
| 6,797,304 | B2 | 9/2004 | McGonagle |
| 6,811,299 | B2 | 11/2004 | Collier |
| D501,354 | S | 2/2005 | Graves et al. |
| D503,069 | S | 3/2005 | Dilollo et al. |
| 6,964,223 | B2 | 11/2005 | O'Loughlin |
| 6,978,682 | B2 | 12/2005 | Foster et al. |
| 7,032,505 | B2 | 4/2006 | Brady |
| 7,093,531 | B2 | 8/2006 | Tardif |
| 7,194,951 | B1 | 3/2007 | Porter |
| D542,078 | S | 5/2007 | Bodum |
| 7,213,507 | B2 | 5/2007 | Glucksman et al. |
| D563,713 | S | 3/2008 | Bodum |
| D565,887 | S | 4/2008 | Bodum |
| D566,454 | S | 4/2008 | Bodum |
| D571,610 | S | 6/2008 | Bodum |
| 7,384,182 | B2 | 6/2008 | Bhavnani |
| D573,396 | S | 7/2008 | Gauss |
| D584,559 | S | 1/2009 | Bodum |
| D587,069 | S | 2/2009 | Bodum |
| D594,267 | S | 6/2009 | Bodum |
| 7,578,231 | B2 | 8/2009 | Liu |
| D610,860 | S | 3/2010 | Bodum |
| D622,546 | S | 8/2010 | Bodum |
| D628,846 | S | 12/2010 | Bodum |
| 7,858,133 | B2 | 12/2010 | Neace, Jr. et al. |
| 7,882,975 | B2 | 2/2011 | Kelly |
| 7,946,752 | B2 | 5/2011 | Swartz et al. |
| 7,958,816 | B2 | 6/2011 | Lin |
| 7,992,486 | B2 | 8/2011 | Constantine et al. |
| D645,290 | S | 9/2011 | Bodum |
| 8,051,766 | B1 | 11/2011 | Yu et al. |
| D652,682 | S | 1/2012 | Eyal |
| D653,492 | S | 2/2012 | Enghard |
| D654,756 | S | 2/2012 | Bodum |
| D655,134 | S | 3/2012 | Gilbert |
| D655,967 | S | 3/2012 | Bodum |
| 8,152,361 | B2 | 4/2012 | Swartz et al. |
| D662,354 | S | 6/2012 | Bodum |
| D663,155 | S | 7/2012 | Bodum |
| 8,272,532 | B2 | 9/2012 | Michaelian et al. |
| 8,313,644 | B2 | 11/2012 | Harris et al. |
| D677,103 | S | 3/2013 | Melzer |
| 8,387,820 | B2 | 3/2013 | Park |
| D681,388 | S | 5/2013 | Bodum |
| 8,448,810 | B2 | 5/2013 | Kelly et al. |
| 8,529,119 | B2 | 9/2013 | Swartz et al. |
| D694,579 | S | 12/2013 | Khubani |
| D695,138 | S | 12/2013 | Ball |
| D698,649 | S | 2/2014 | Quint |
| D700,807 | S | 3/2014 | Kershaw et al. |
| D701,425 | S | 3/2014 | Pearson |
| 8,667,662 | B2 | 3/2014 | Kelly |
| 8,695,486 | B2 | 4/2014 | Bodum |
| 8,770,097 | B2 | 7/2014 | McLean et al. |
| 2001/0053399 | A1 | 12/2001 | Herod |
| 2003/0047081 | A1 | 3/2003 | McGonagle |
| 2003/0070979 | A1 | 4/2003 | Huang |
| 2003/0205145 | A1 | 11/2003 | Chang |
| 2004/0206243 | A1 | 10/2004 | Foster et al. |
| 2005/0046211 | A1 | 3/2005 | Nole et al. |
| 2005/0109689 | A1 * | 5/2005 | Trachtenbroit ......... A47J 31/20 210/238 |
| 2006/0118481 | A1 | 6/2006 | Trachtenbroit |
| 2007/0028779 | A1 * | 2/2007 | Pigliacampo ........... A47J 31/20 99/297 |
| 2007/0151461 | A1 * | 7/2007 | Edmark .................. A47J 31/20 99/279 |
| 2007/0187421 | A1 | 8/2007 | Constantine et al. |
| 2007/0251956 | A1 | 11/2007 | Wasserman et al. |
| 2008/0041860 | A1 | 2/2008 | Wiedmeyer et al. |
| 2009/0020018 | A1 * | 1/2009 | Melzer ................ A47J 31/0615 99/288 |
| 2010/0263549 | A1 | 10/2010 | Lee |
| 2010/0294772 | A1 | 11/2010 | Judge |
| 2010/0319549 | A1 | 12/2010 | Kelty et al. |
| 2011/0056385 | A1 * | 3/2011 | McLean .................. A47J 31/20 99/297 |
| 2011/0168644 | A1 * | 7/2011 | Harris ..................... C02F 1/002 210/767 |
| 2011/0309094 | A1 | 12/2011 | Bodum |
| 2012/0067890 | A1 | 3/2012 | Cahen et al. |
| 2012/0097042 | A1 | 4/2012 | Lin |
| 2012/0199160 | A1 | 8/2012 | Galbis |
| 2012/0216682 | A1 | 8/2012 | Bodum |

(56) References Cited

U.S. PATENT DOCUMENTS

| | | | |
|---|---|---|---|
| 2012/0328750 A1 | 12/2012 | Giordano | |
| 2013/0142592 A1 | 6/2013 | Khowaylo et al. | |
| 2013/0175278 A1 | 7/2013 | Kah, Jr. | |
| 2013/0213240 A1 | 8/2013 | O'Brien | |
| 2013/0233869 A1 | 9/2013 | Tamarit Rios | |
| 2013/0284030 A1 | 10/2013 | Katz et al. | |
| 2014/0001208 A1 | 1/2014 | Bodum | |
| 2014/0054301 A1 | 2/2014 | Guoqing | |
| 2014/0060337 A1 | 3/2014 | Varnum | |
| 2014/0072684 A1 | 3/2014 | Madden | |
| 2014/0076908 A1 | 3/2014 | Pinelli | |
| 2014/0166695 A1* | 6/2014 | Rasmussen | B67D 1/0462 222/95 |
| 2014/0205725 A1* | 7/2014 | Albanese | A47J 31/20 426/433 |
| 2014/0311353 A1 | 10/2014 | McLean et al. | |
| 2015/0196158 A1* | 7/2015 | Velasquez | A47J 31/20 99/297 |
| 2016/0166103 A1* | 6/2016 | Morse | A47J 31/20 99/297 |

FOREIGN PATENT DOCUMENTS

| | | |
|---|---|---|
| CN | 200974622 Y | 11/2007 |
| CN | 201595680 U | 10/2010 |
| CN | 201691689 U | 1/2011 |
| CN | 201831469 U | 5/2011 |
| DE | 20104815 U1 | 6/2001 |
| EP | 1267684 B1 | 5/2006 |
| FR | 1249992 A | 1/1961 |
| GB | 2506503 A | 4/2014 |

OTHER PUBLICATIONS

Extended European Search Report for corresponding European Patent Application No. EP 15830234, dated Mar. 2, 2018.

International Preliminary Report on Patentability, dated Nov. 17, 2010, and International Search Report, dated Aug. 6, 2009, for related application PCT/CA2009/000604, and 4 pages.

La Marzocco International, "Swift EPS_B Operating Manual V1.0," copyright 2002, pp. 1-31 (incl. pp. 8-12, 19, 25, 20-30), La Marzocco, International, USA.

Macap, <http://www.macap.it/english/prodotto.asp?cat=1&subcat=4>, accessed Mar. 15, 2005, posted as early as 2002, p. 1.

1st-Line Equipment, <http://www.1st-line.net/cgi-bin/category.cgi?item=CPS&type=store>, accessed Mar. 15, 2005, posted as early as 2002, pp. 1-2.

Coffeegeek, <http://www.coffeegeek.com/reviews/accessories/autotamper/tenacioustommy>, posted Oct. 24, 2002, pp. 1-5.

Schomer, D.C., <http://www.lucidcafe.com/cafeforum/schomertable11.html>, revised Oct. 24, 1997, copyright 1996-97, pp. 1-2.

Crankshaw, J., <http://home.att.net/~jcrankshaw/tamper.htm>, accessed Sep. 16, 2003, copyright 199-2002, pp. 1-3.

Coffee Research Institute, "Tamping," <http//www.coffeeresearch.org/espresso/tamping.htm>, accessed Nov. 26, 2004, posted 2001 or earlier, pp. 1-3.

Medium Espro Press, available at https://www.kickstarter.com/projects/bruceconstantine/the-medium-espro-press, Feb. 26, 2013.

Espro Press, available at https://www.kickstarter.com/projects/bruceconstantine/the-espro-press?ref=nav_search, Nov. 25, 2011.

European Supplemental Search Report in related application No. EP 09745330, dated Jul. 28, 2015.

\* cited by examiner

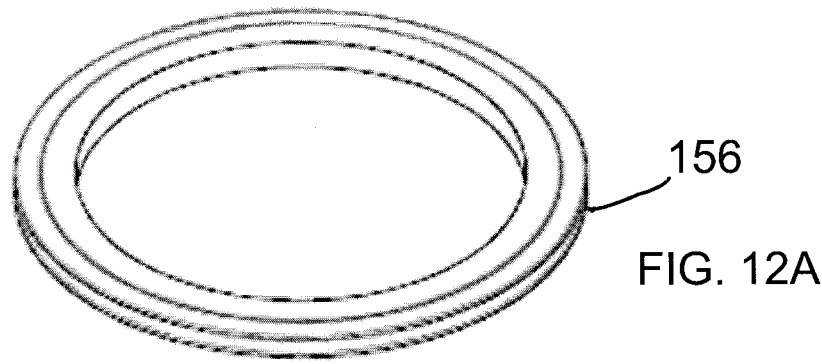
FIG. 12A
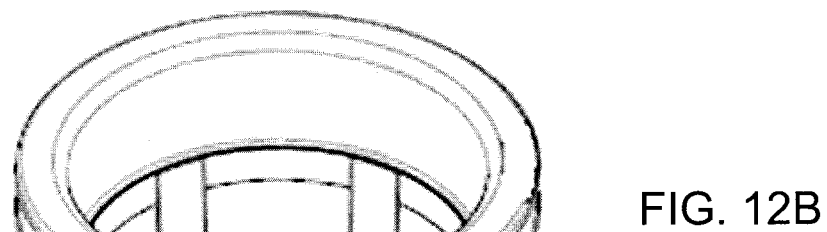
FIG. 12B
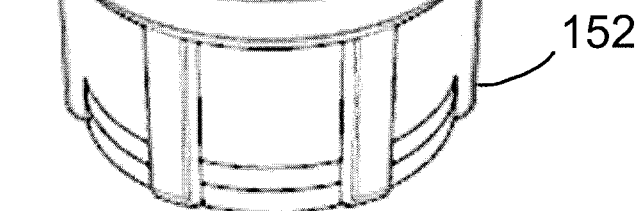
FIG. 12C
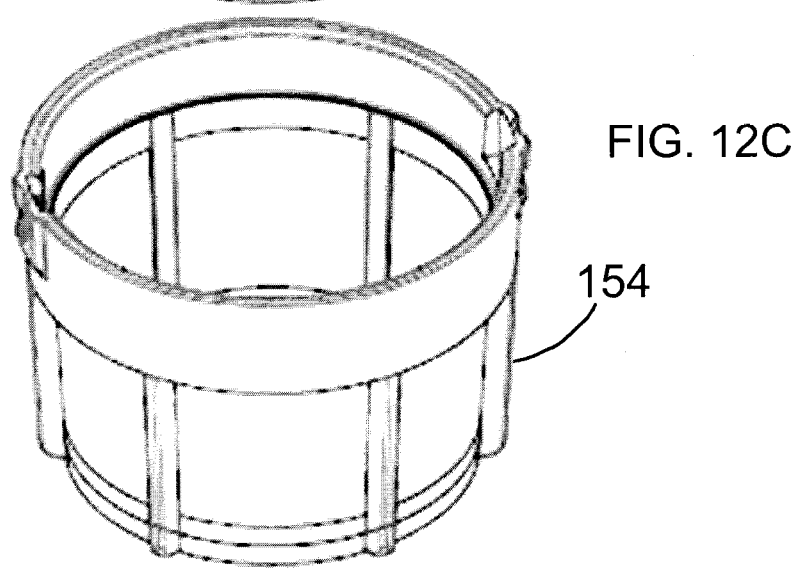

FIG. 26G
FIG. 26C
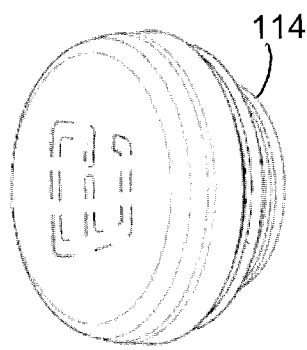
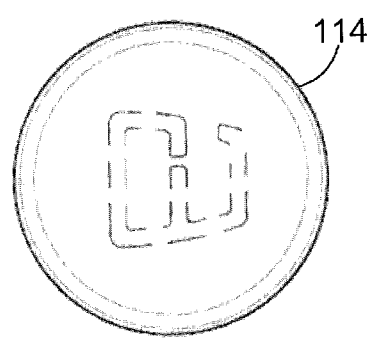
FIG. 26F
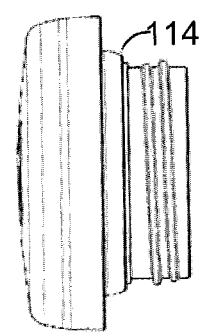
FIG. 26H
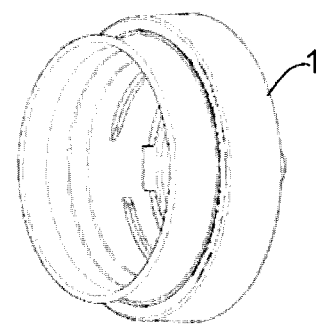
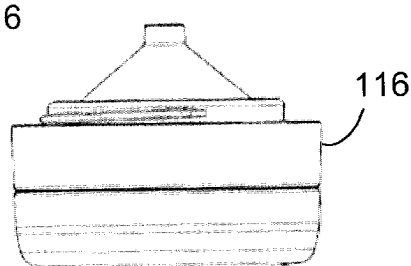
FIG. 26B
FIG. 26E
FIG. 26I
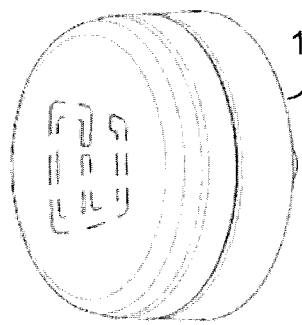
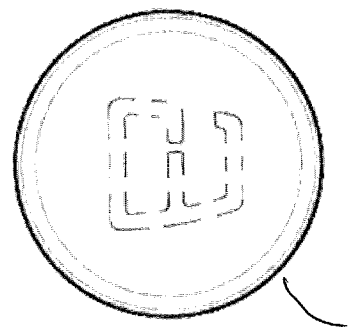
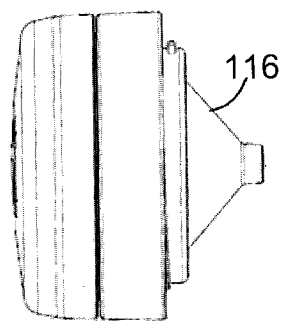
FIG. 26A
FIG. 26D

PRESS FOR EXTRACTING AN INFUSION

CROSS-REFERENCE TO RELATED APPLICATIONS

This application claims the benefit of priority to U.S. Provisional Patent Application Ser. No. 62/034,441, filed Aug. 7, 2014.

FIELD OF THE INVENTION

The present invention relates generally to apparati capable of carrying out an extraction of an infusible material, and more particularly to presses for extracting an infusion such as from coffee or tea.

BACKGROUND TO THE INVENTION

A main function of extraction presses is to ensure a separation between bulk infusible material such as coffee grinds and tea leaves, from an extract intended for consumption. While many different press and filter designs have been implemented, there is still room for improvement in achieving optimal separation.

SUMMARY OF THE INVENTION

It is an object of the present invention to provide an improved extract separation apparatus to address some of the shortcomings of extraction apparati known in the art.

In a first embodiment of the present invention, an extract separation apparatus for separating an infused extract from a mixture of an infusible material and the extract is described. The apparatus in such first embodiment comprises a plunger element adapted to be inserted into an infusing container containing the mixture and having one or more substantially vertical inner walls oriented substantially parallel to a vertical axis of the container, wherein the plunger element is adapted to be moved within the container along the vertical axis thereof. The plunger element according to the first embodiment comprises a plunging means adapted to move the plunger element within the infusing container along the vertical axis thereof, and a first surface substantially transverse to the vertical axis and comprising sealing means situated at one or more edges of said first surface, wherein said sealing means are adapted for sealing engagement with the one or more inner walls of the infusing container as the plunger element is moved within the container, to define a first chamber containing the mixture of infusible material and extract bounded by said first surface. The plunger element further comprises a second surface extending from said first surface and defining a second chamber, said second surface comprising one or more extract flow openings, wherein said one or more extract flow openings are adapted to permit flow of extract from said first chamber into said second chamber, and wherein at least a portion of said one or more extract flow openings in said second surface are situated at a depth, wherein said depth is separated from said first surface, either above or below said first surface along the vertical axis.

BRIEF SUMMARY OF THE DRAWINGS

FIG. 12A is a perspective view of a peripheral seal of a filter assembly of an exemplary embodiment of a press according to the present invention.

FIG. 12B is a perspective view of an inner filter of a filter assembly of an exemplary embodiment of a press according to the present invention.

FIG. 12C is a perspective view of an outer filter of a filter assembly of an exemplary embodiment of a press according to embodiments of the present invention.

FIG. 26A is a side perspective view of an exemplary embodiment of a cap assembly for use in a press according to the present invention.

FIG. 26B is a side perspective view of an exemplary embodiment of a base portion of a cap assembly for use in a press according to the present invention.

FIG. 26C is a side perspective view of an exemplary embodiment of an upper portion of a cap assembly for use in a press according to the present invention.

FIG. 26D is a top plan view of an exemplary embodiment of a cap assembly for use in a press according to the present invention.

FIG. 26E is a front plan view of an exemplary embodiment of a cap assembly for use in a press according to the present invention.

FIG. 26F is a top plan view of an exemplary embodiment of an upper portion of a cap assembly for using a press according to the present invention.

FIG. 26G is front plan view of an exemplary embodiment of an upper portion of a cap assembly for use in a press according to the present invention.

FIG. 26H is a plan view of an exemplary embodiment of an upper portion of a cap assembly viewed perpendicularly and opposite (rear) to the view shown in FIG. 26G.

FIG. 26I is a plan view of an exemplary embodiment of the cap assembly viewed perpendicularly and opposite (rear) to the view shown in FIG. 26E.

DETAILED DESCRIPTION

Figure 1:
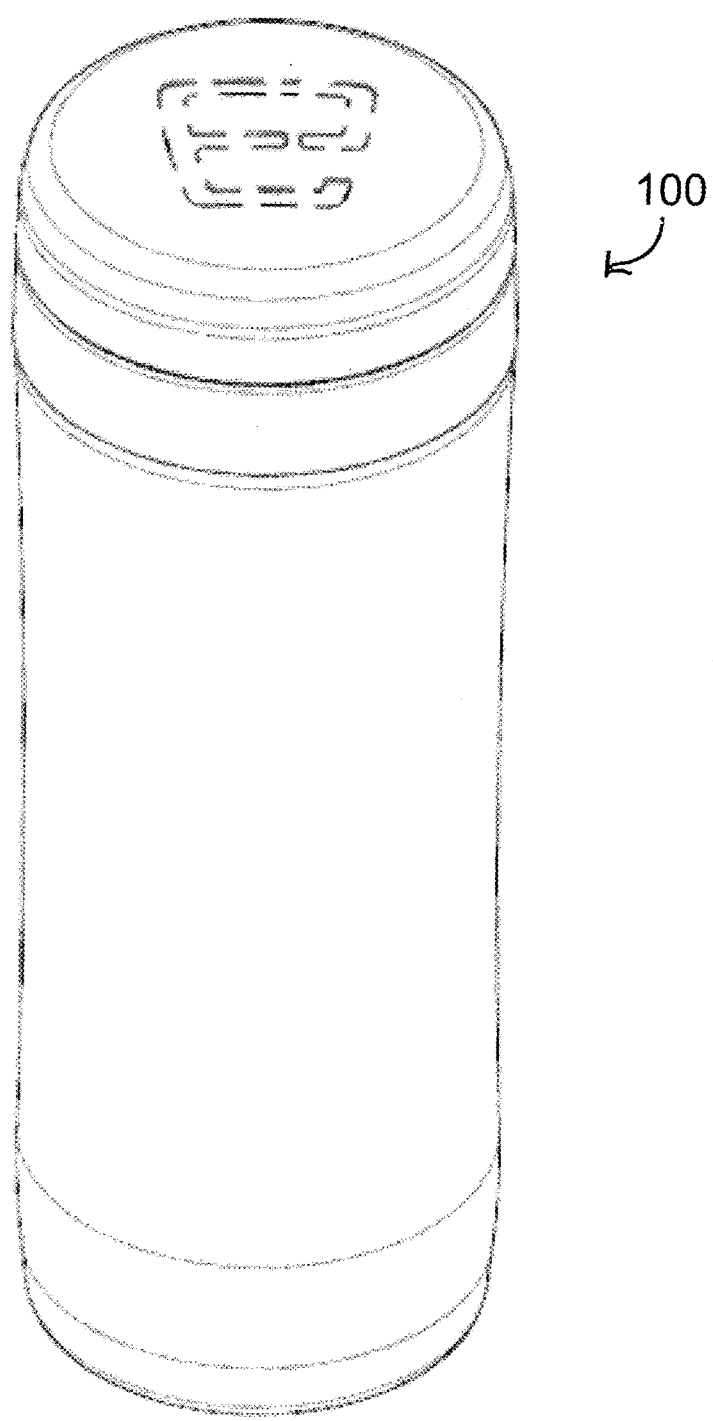
FIG. 1 is a front, perspective view of an exemplary embodiment of a press according to the present invention.
Figure 2:
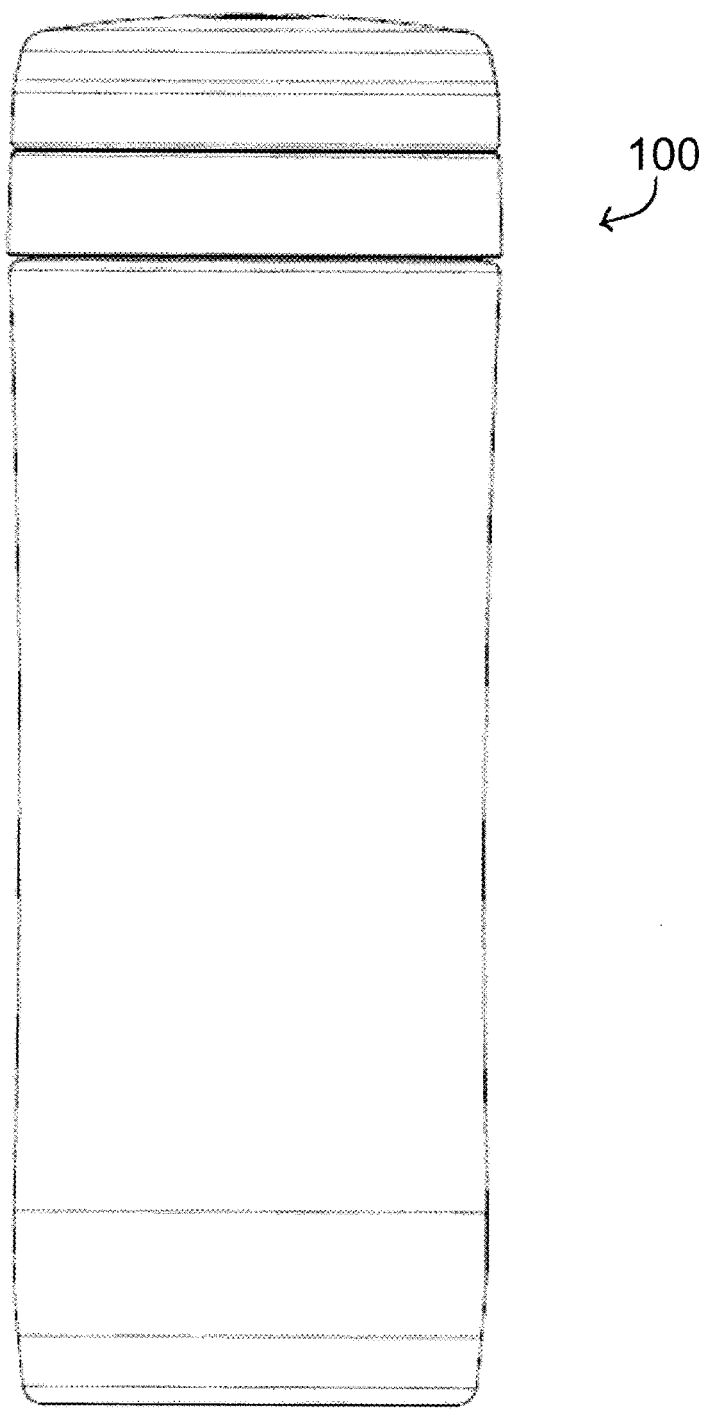
FIG. 2 is a front plan view of an exemplary embodiment of a press according to the present invention.
Figure 3:
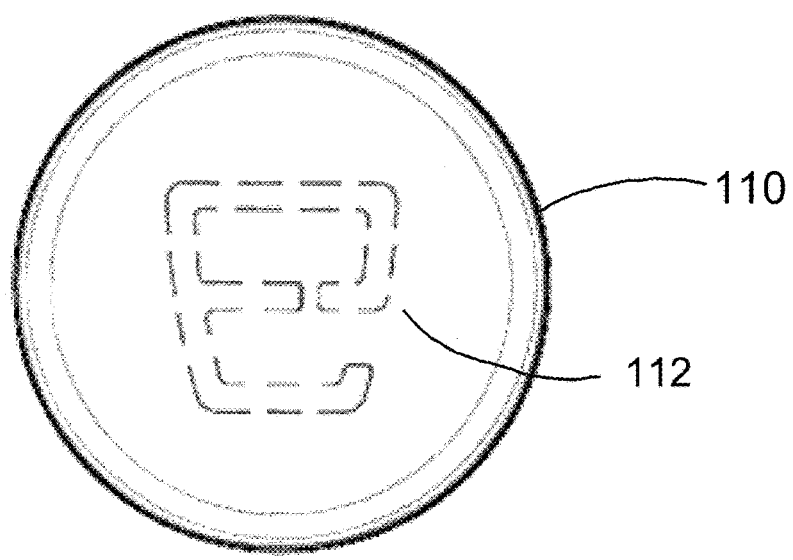
FIG. 3 is a top view of a cap of an exemplary embodiment of a press according to the present invention.
Figure 4:
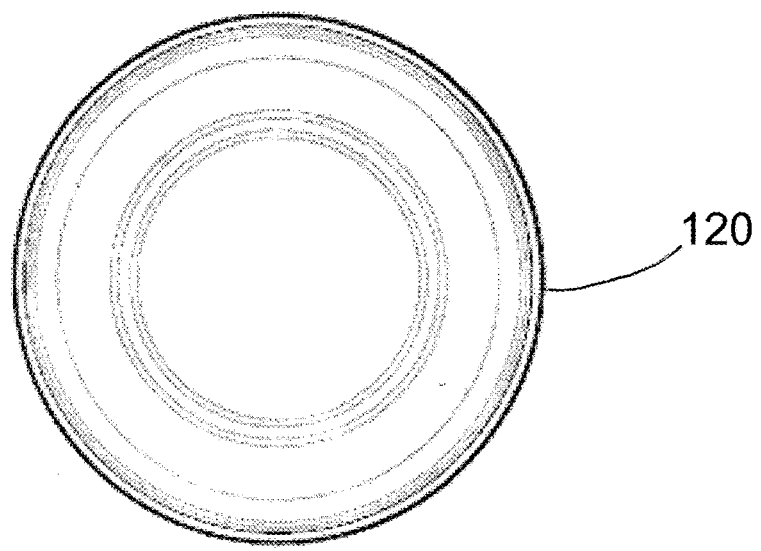
FIG. 4 is a bottom view of a cap of an exemplary embodiment of a press according to the present invention.
Figure 13A:
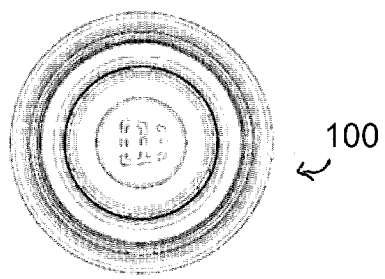
FIG. 13A is a top view of an exemplary embodiment of a press according to the present invention.
Figure 13B:
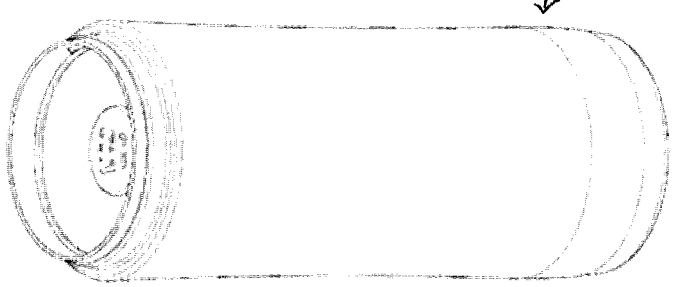
FIG. 13B is a side perspective view of an exemplary embodiment of a press according to the present invention.

FIG. 1 is a front, perspective view of an exemplary embodiment of a press 100 in accordance with the disclosure and FIG. 2 shows a front plan view of the press. In particular, the illustrated press is well suited for extracting an infusion from coffee grounds. As illustrated, the press includes an elongate double-walled cylindrical body, preferably made from stainless steel or other suitable metal. The press includes a removable cap assembly 110, which is discussed in further detail below. As further illustrated in FIG. 3, a design or other logo 112 can be printed on or formed into the press. Indicia or other designs can be formed into the bottom face 120 of the press, as illustrated in FIG. 4. FIG. 13A shows a top view and FIG. 13B shows a side perspective view of the press 100 (with cap removed).

Figure 5:
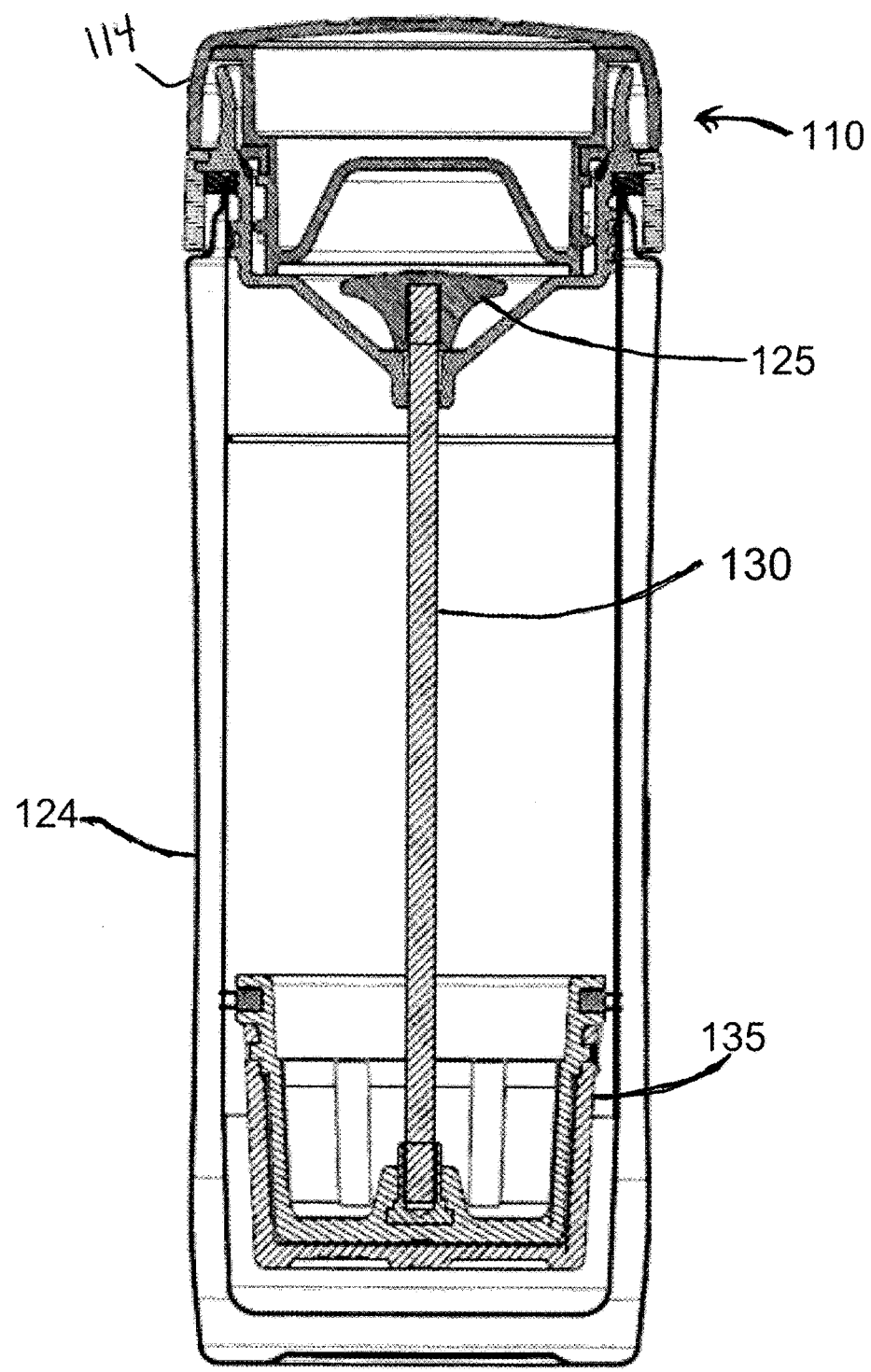
FIG. 5 is a vertical cross-sectional view of an exemplary embodiment of a press according to the present invention.
Figure 6:
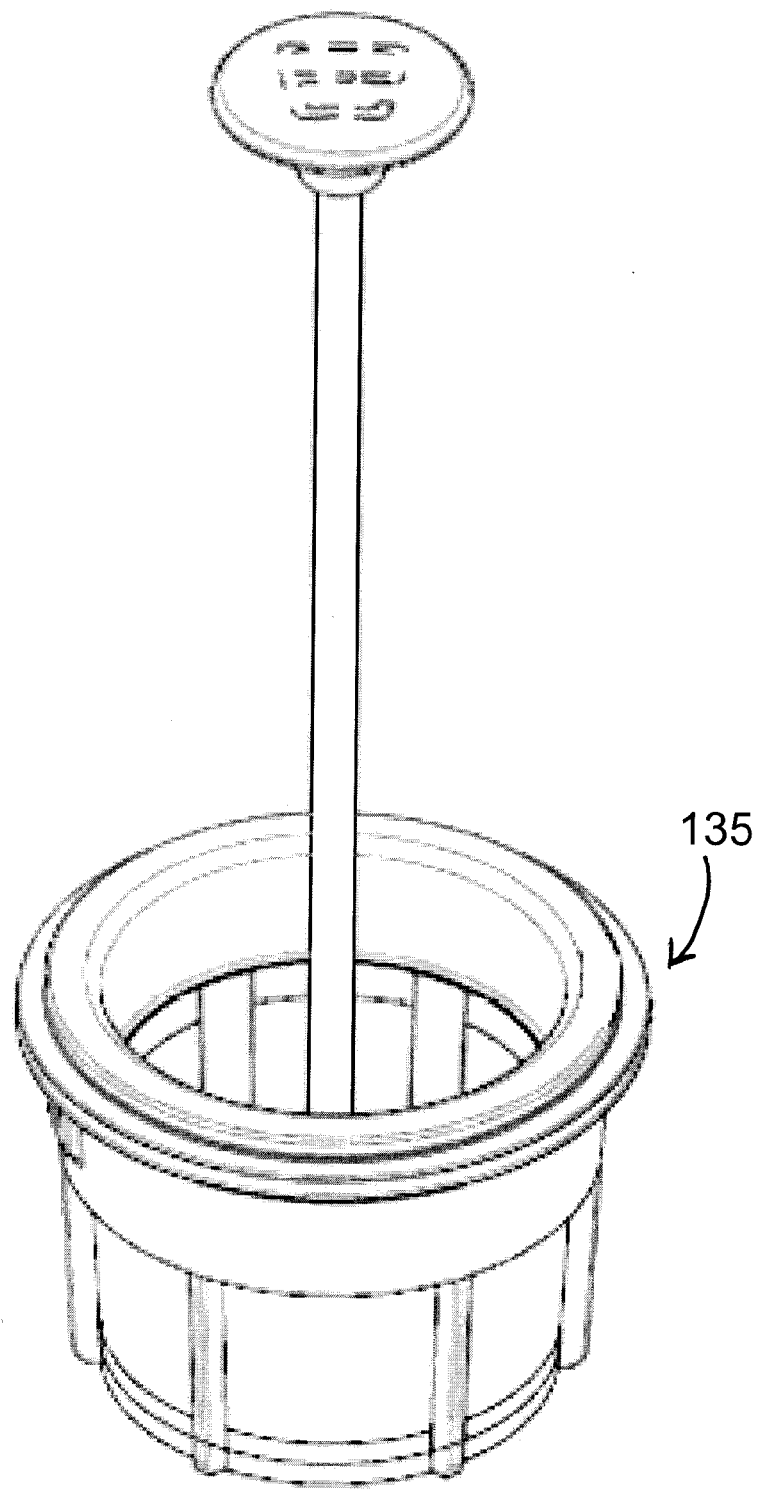
FIG. 6 shows a top perspective view of a plunger with filter assembly for use in an exemplary embodiment of a press according to the present invention.
Figures 7, 8:
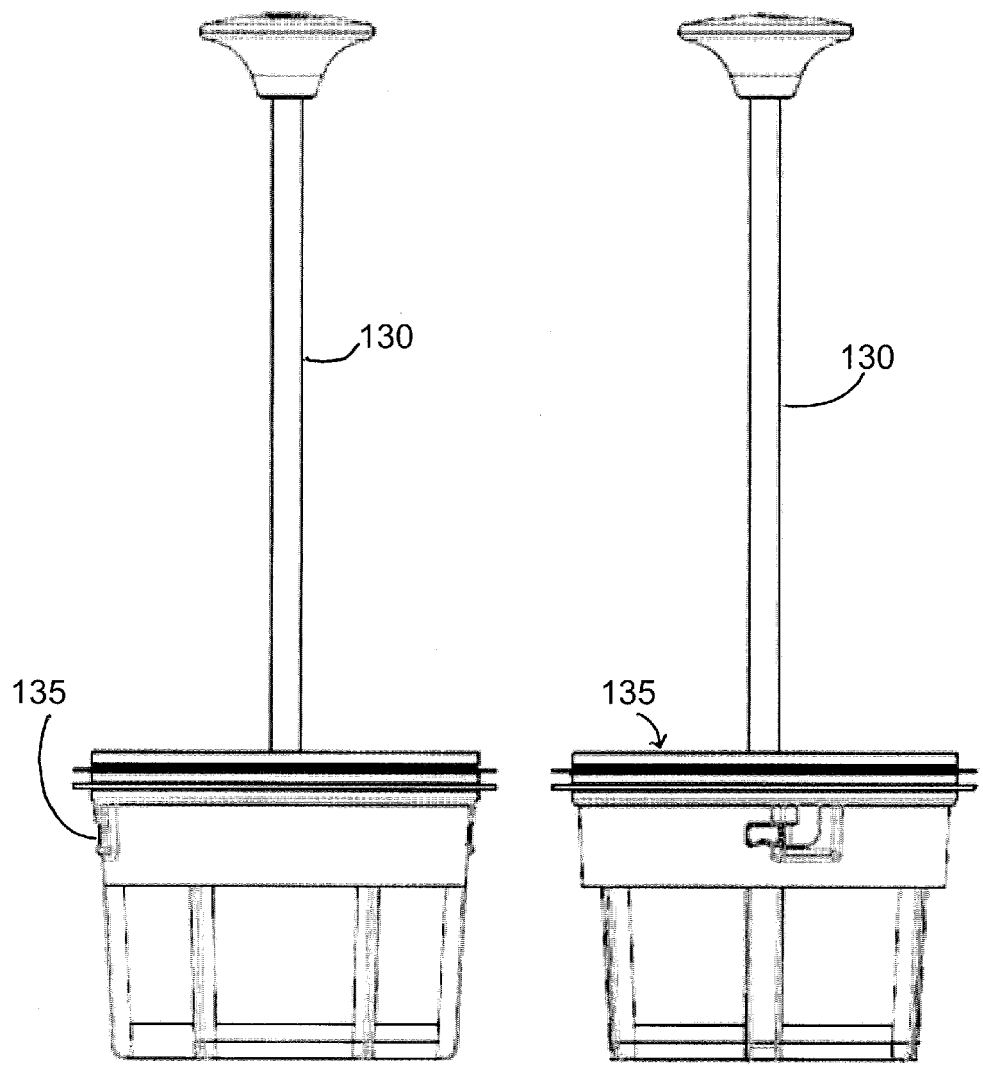
FIG. 7 shows a vertical plan front view of a plunger with filter assembly for use in an exemplary embodiment of a press according to the present invention.
FIG. 8 shows a vertical plan rear view of a plunger with filter assembly for use in an exemplary embodiment of a press according to the present invention.
Figure 9:
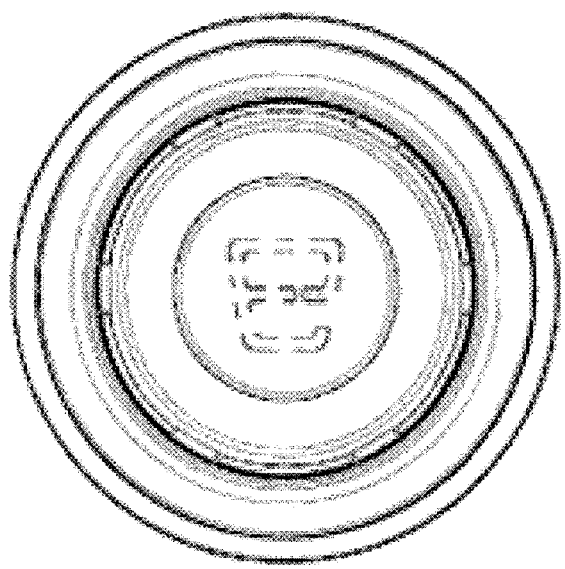
FIG. 9 shows a bottom plan view of a filter assembly of a press according to an exemplary embodiment the present invention.
Figure 10:
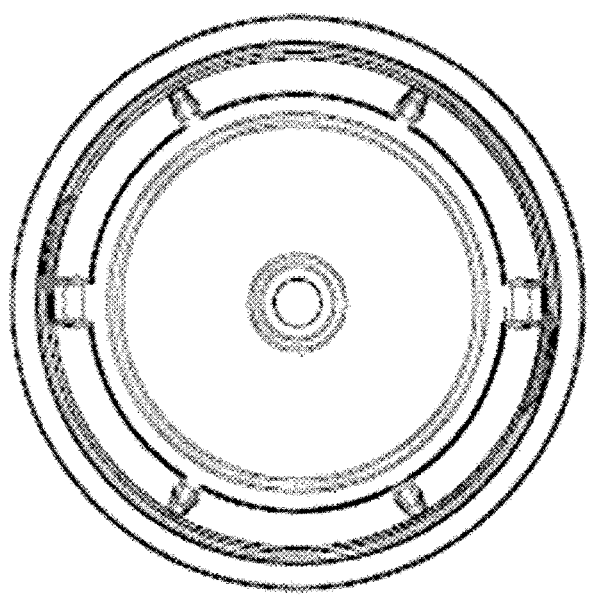
FIG. 10 shows a top plan view of a filter assembly of an exemplary embodiment of a press according to the present invention.
Figure 11A:
FIG. 11A is a front plan view of a peripheral seal of a filter assembly of an exemplary embodiment of a press according to the present invention.
Figure 11B:
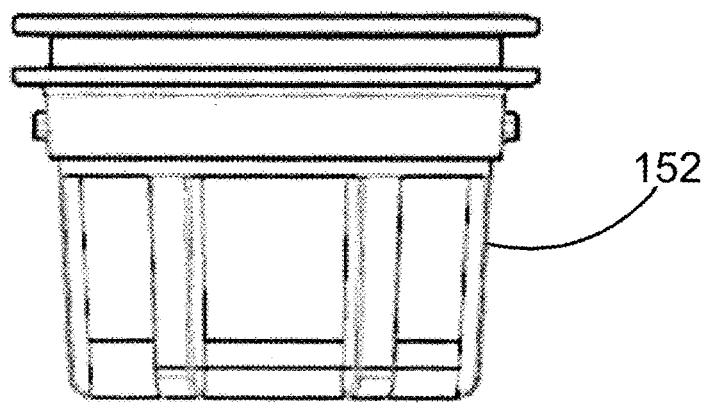
FIG. 11B is a front plan view of an inner filter of a filter assembly of an exemplary embodiment of a press according to the present invention.
Figure 11C:
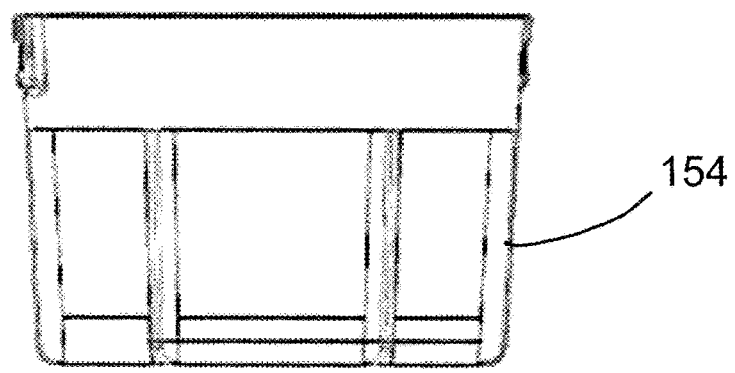
FIG. 11C is a front plan view of an outer filter of a filter assembly of an exemplary embodiment of a press according to the present invention.
Figure 13C:
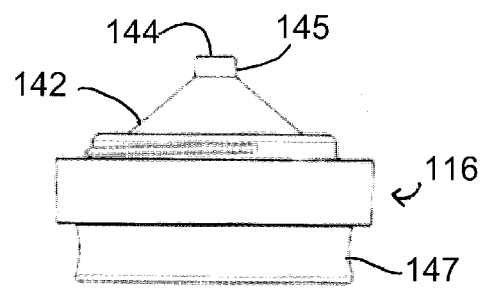
FIG. 13C is a front view of an exemplary embodiment of a base portion of a cap assembly of a press according to the present invention.
Figure 13D:
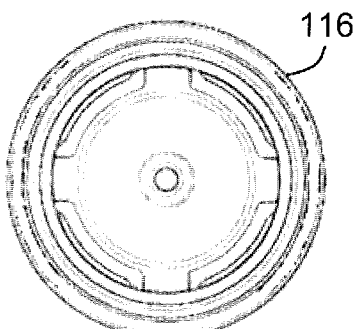
FIG. 13D is a top plan view of an exemplary embodiment of a base portion of a cap assembly of a press according to the present invention.
Figure 13E:
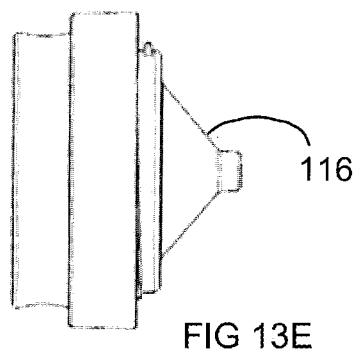
FIG. 13E is a horizontal side view of an exemplary embodiment of a base portion of a cap assembly of a press according to the present invention.

A cross sectional view of the press 100 of FIG. 1 is presented in FIG. 5. As illustrated, the lower base portion 124 of the press is formed by a double insulated metallic vessel, but it will be appreciated that other materials can be used. The presses disclosed herein can be configured to hold any desired amount of fluid. In a preferred embodiment, the press is suitable for use in travel, such as being transported within a vehicular cup holder. Accordingly, the vessel of the press is preferably configured to hold between about 8 and about 24 fluid ounces of fluid. As is further evident from FIG. 5, an upper portion 114 of the cap 110 can be removed to expose a handle 125 of a plunger 130 that is in turn attached to a filter assembly 135 within the base portion 124 of the device. FIGS. 26C, 26F, 26G and 26H present perspective, top, front plan and side view of the upper portion 114 of the cap. An upward concentric indentation is formed within the lower face of the upper portion 114 of the cap, such as in order to permit upward movement of the plunger 130 with the cap 110 installed. FIGS. 13C, 13D and 13E are front vertical plan, top plan, and front horizontal plan views of a base portion 116 of the cap assembly. FIG. 26B shows a bottom perspective view of the base portion 116. FIGS. 26A, 26D, 26E and 26I illustrate views of the complete cap 110 with upper 114 and base portions 116 assembled together. As illustrated, for example in FIG. 13C, the base portion 116 of the cap assembly 110 includes a conical funnel shaped radially interior portion 142 having a central orifice 144 for receiving the shaft of the press plunger. The funnel 142 terminates in a tubular portion 145 defining an elongate conduit therethrough for receiving the plunger shaft. Peripheral openings are distributed and formed through a base annular region 147 of the base portion 116 of the cap to permit infused fluid to freely flow out of the press to be drank by the user of the press. The base portion 116 of the cap 110 further extends upward to define a cylindrical structure that can facilitate direction and drinking of the extract. Excess extract not drank by the user can flow freely back into the vessel. An upper end of the plunger shaft 130 includes a generally round handle 125 connected thereto. As illustrated in FIG. 5, the plunger handle 125 has a cross section with a relatively flat top, a rounded peripheral edge, and an annularly concave lower portion that tapers toward the shaft. The plunger shaft 130 can be threaded to the handle or otherwise attached, preferably removably attached. The base portion of the cap 116 is removably attached to the lower vessel.

A lower portion of the plunger shaft 130 is attached to a filter assembly 135, as illustrated in various views in FIGS. 6-10, 11A-11C and 12A-12C. The disclosed filter assembly 135 includes two round concentric removable baskets 152, 154 that form an inner and outer filter, preferably with a relatively coarser mesh on the outer, primary filter, and a finer mesh on the inner, secondary filter. The two filter baskets 152, 154 are preferably assembled to each other via a twist-lock connection complemented by an interference fit (e.g., transitional fit that is slightly loose or partially interferes), optionally with an o-ring or other seal interposed between the components to form a fluid tight seal. A twist lock connection with a relatively tight fit can advantageously be used to eliminate the need for an o-ring. A peripheral double seal 156 is disposed around the top of the inner filter basket to mate with an inner surface of the lower vessel portion 124 of the press.

Figure 14:
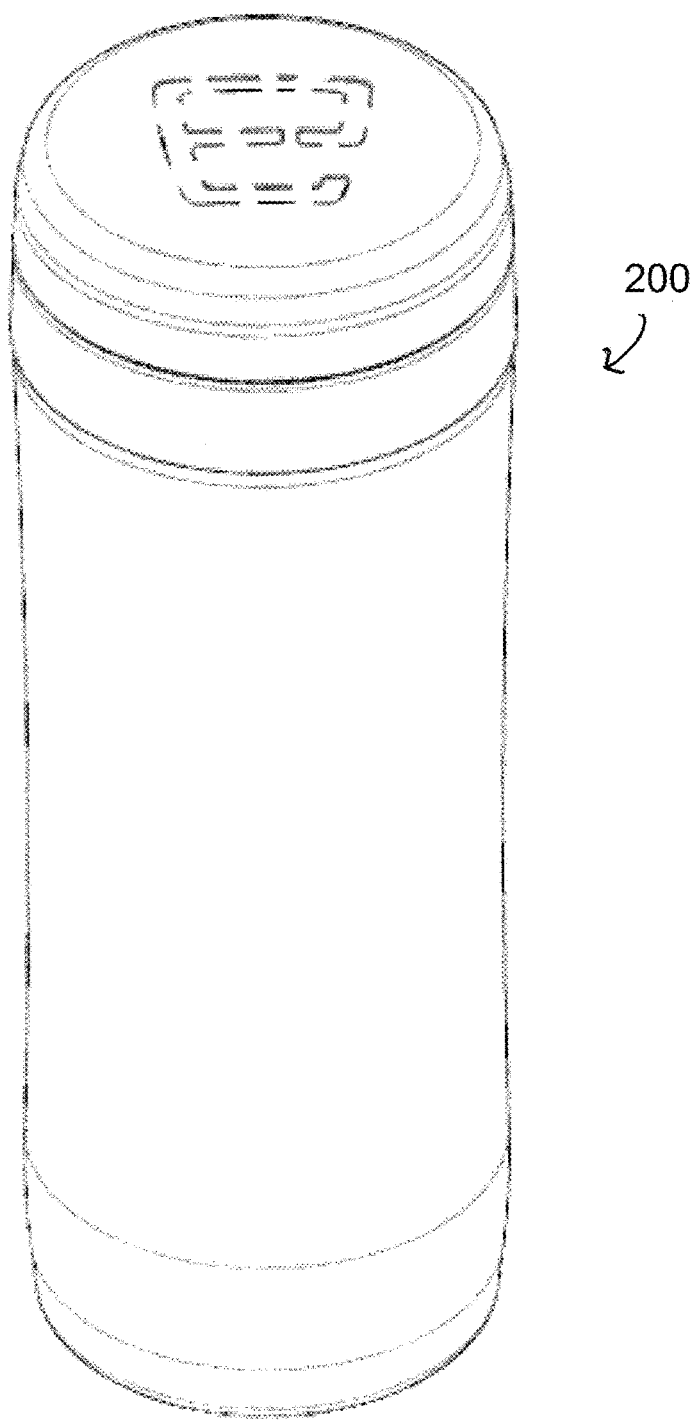
FIG. 14 is a front, perspective view of another exemplary embodiment of a press according to the present invention.
Figure 15:
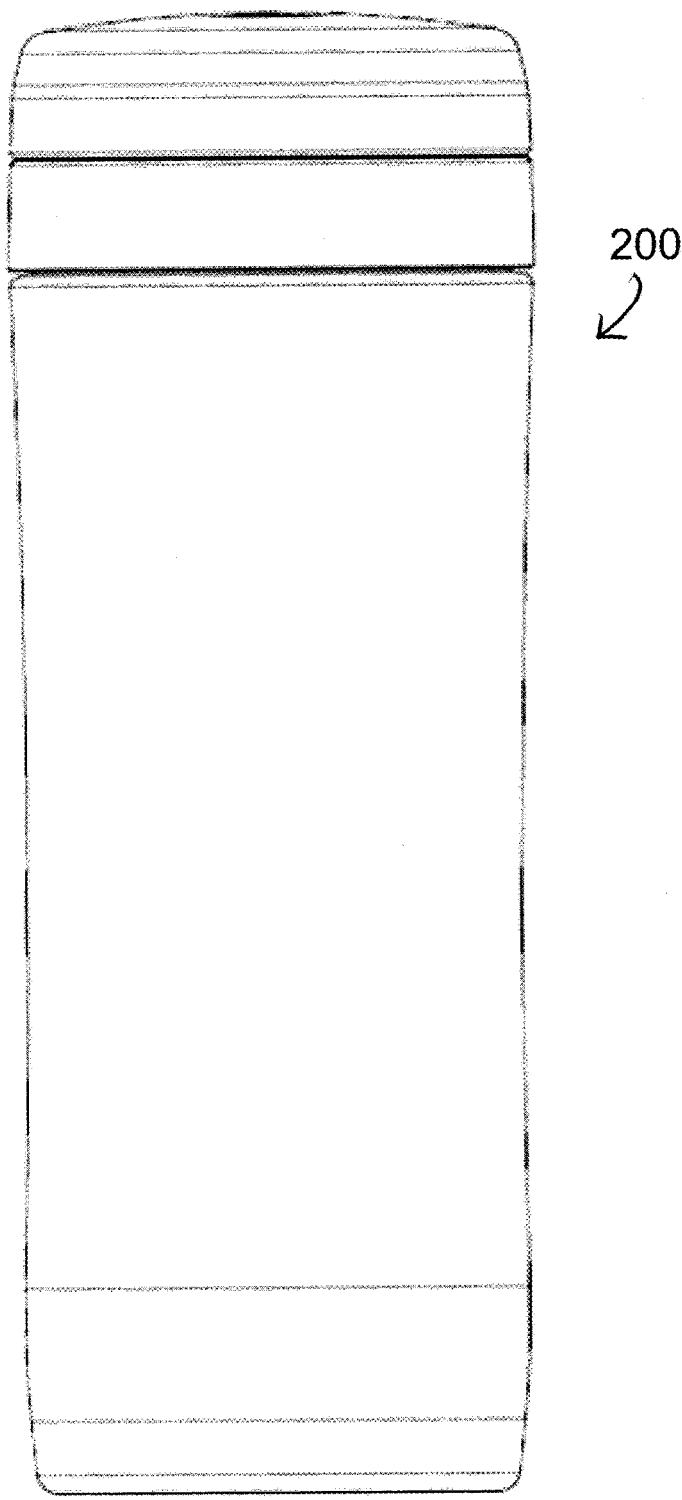
FIG. 15 is a front plan view of another exemplary embodiment of a press according to the present invention.
Figure 16:
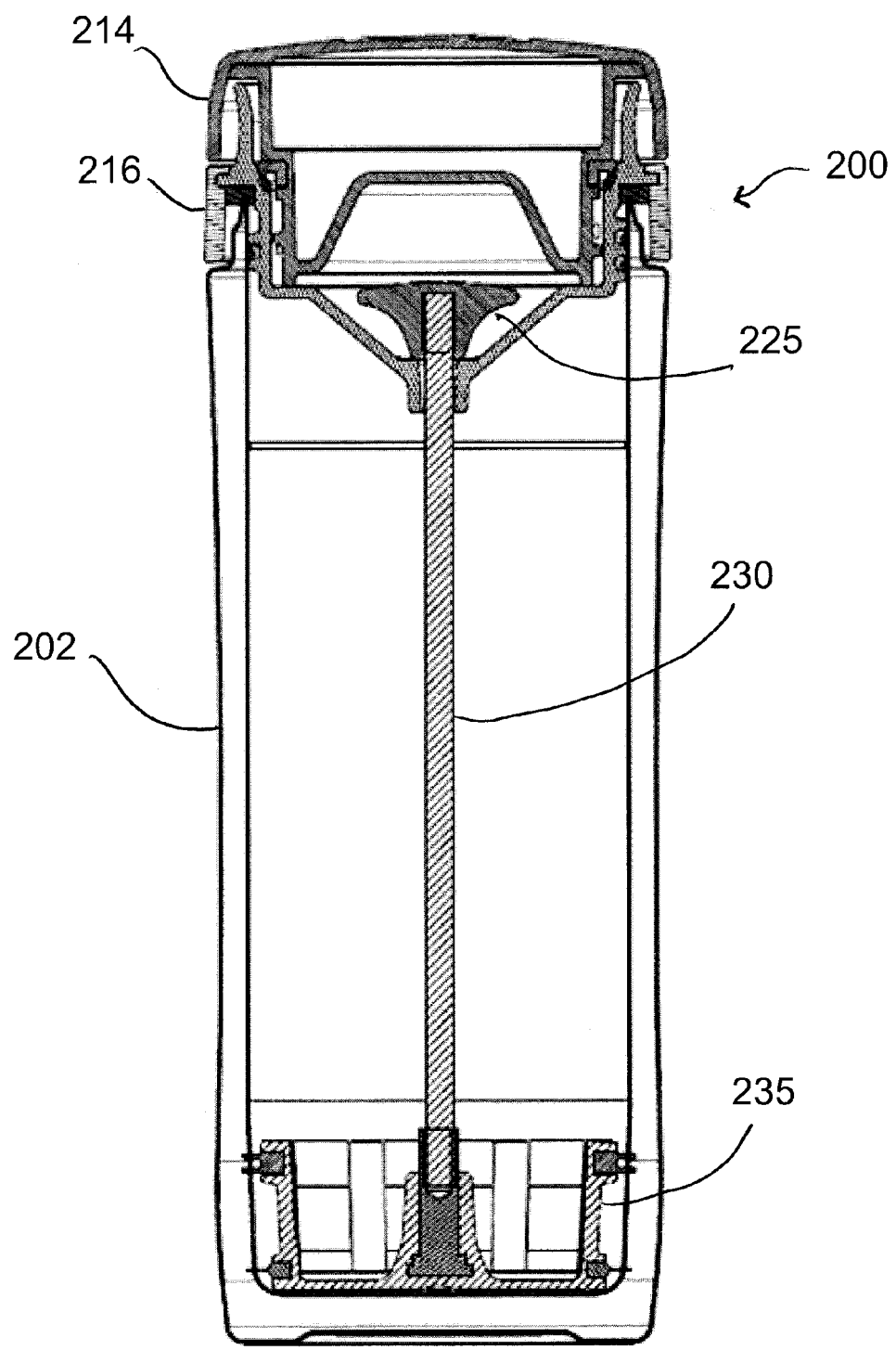
FIG. 16 is a vertical cross-sectional view of another exemplary embodiment of a press according to the present invention.
Figure 17:
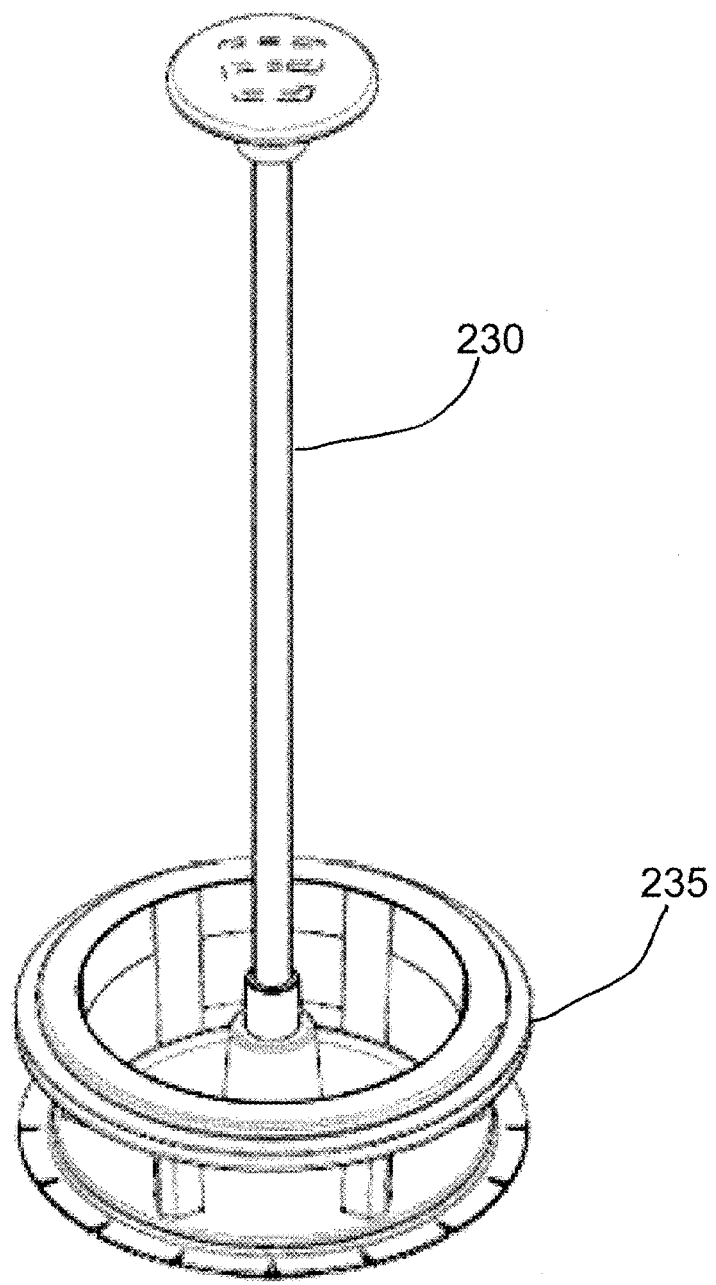
FIG. 17 is a perspective view of another exemplary embodiment of a filter assembly for use in a press according to the present invention.
Figure 18A:
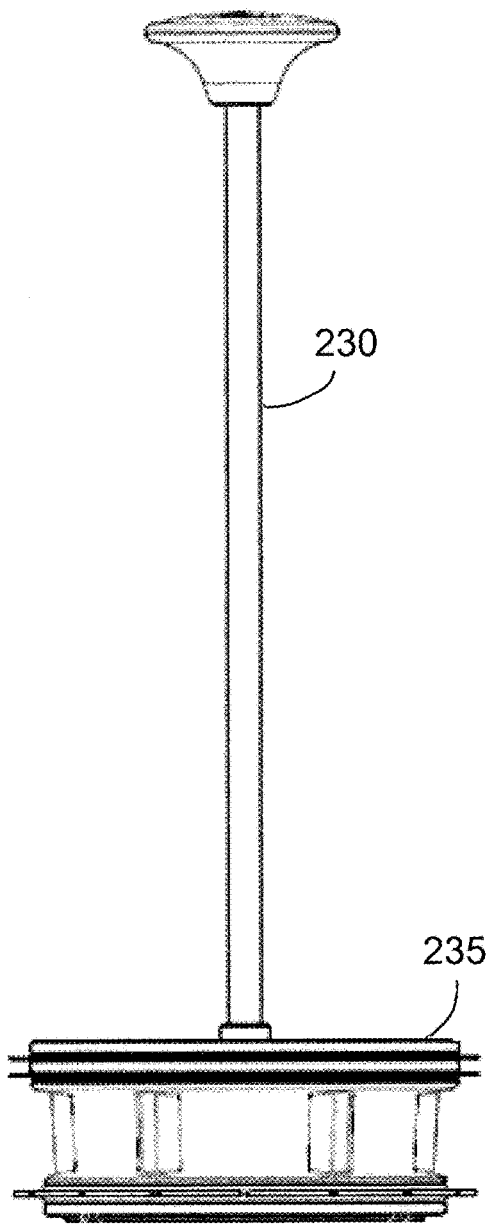
FIG. 18A is a front plan view of the filter assembly shown in FIG. 17.
Figure 18B:
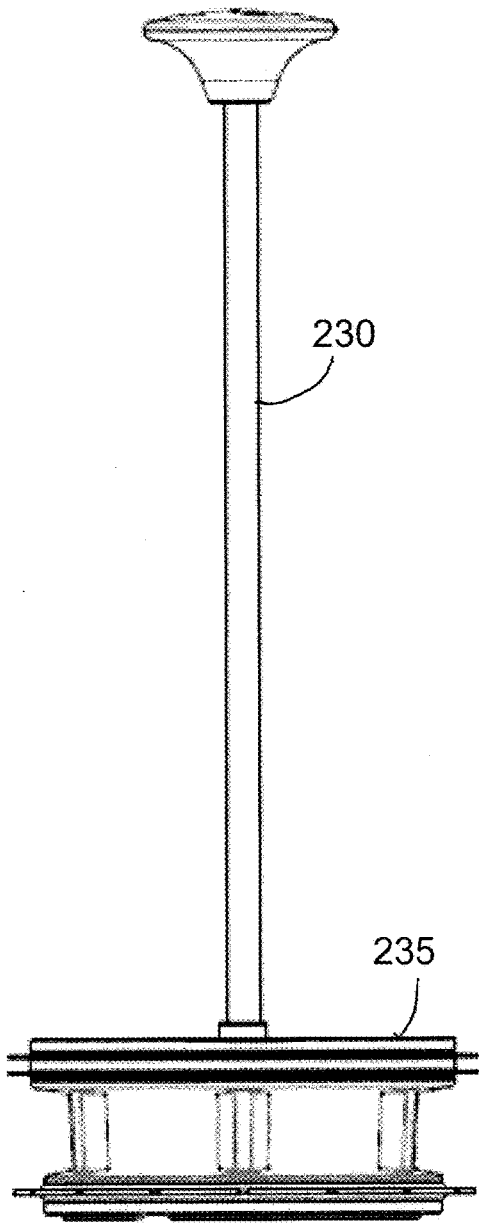
FIG. 18B is a rear plan view of the filter assembly shown in FIG. 17.
Figure 19A:
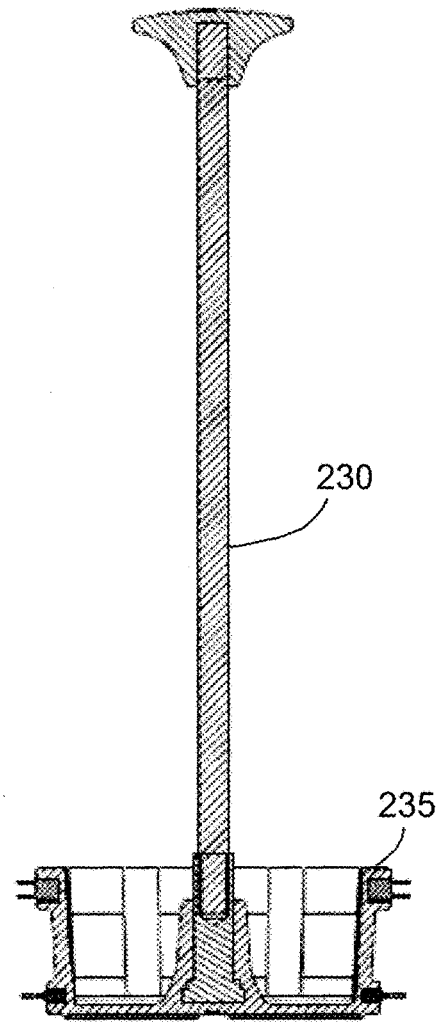
FIG. 19A is a front, cross-sectional view of the filter assembly shown in FIG. 17.
Figure 19B:
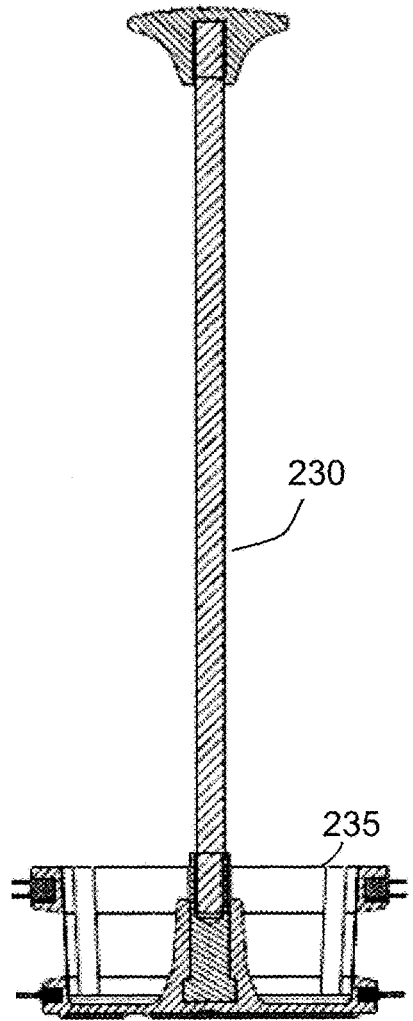
FIG. 19B is a rear, cross-sectional view of the filter assembly shown in FIG. 17.
Figure 20A:
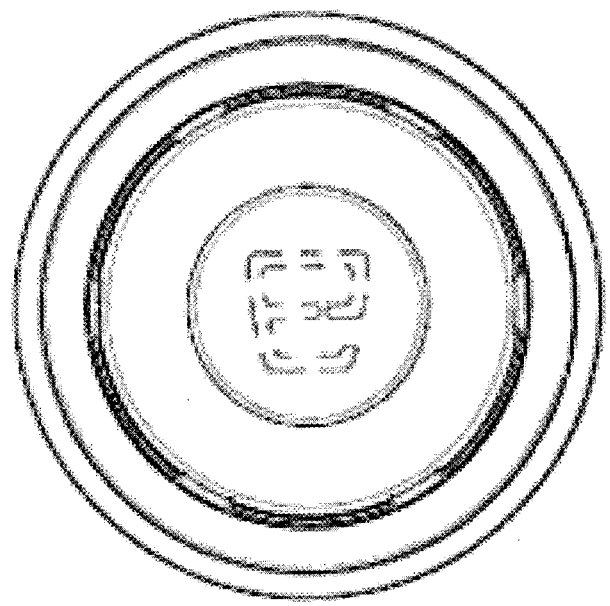
FIG. 20A is a bottom plan view of the filter assembly shown in FIG. 17.
Figure 20B:
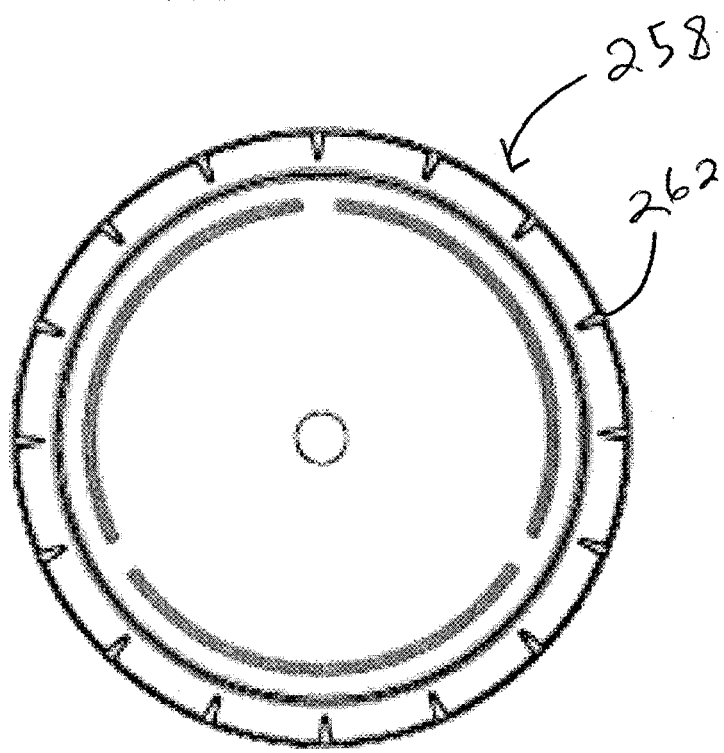
FIG. 20B is a top plan view of the filter assembly shown in FIG. 17
Figure 21A:
FIG. 21A is a front plan view of a peripheral seal of the filter assembly shown in FIG. 17 according to an embodiment of the present invention.
Figure 21B:
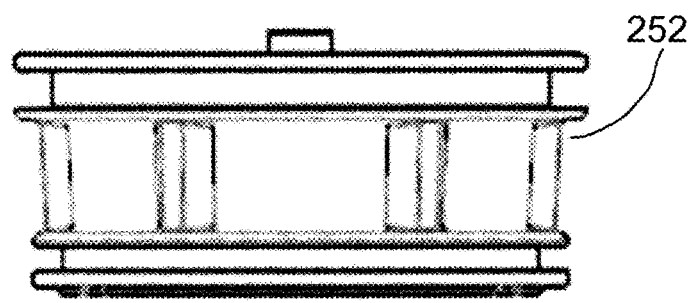
FIG. 21B is a front plan view of a filter basket of the filter assembly shown in FIG. 17 according to an embodiment of the present invention.
Figure 21C:
FIG. 21C is a front plan view of a wiping seal of the filter assembly shown in FIG. 17 according to an embodiment of the present invention.
Figure 22A:
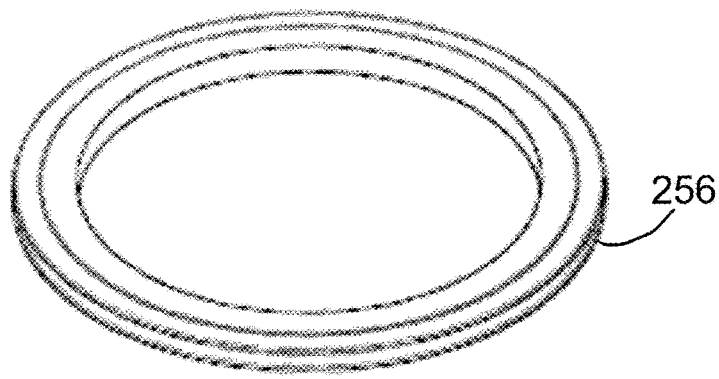
FIG. 22A is a front perspective view of a peripheral seal of the filter assembly shown in FIG. 17 according to an embodiment of the present invention.
Figure 22B:
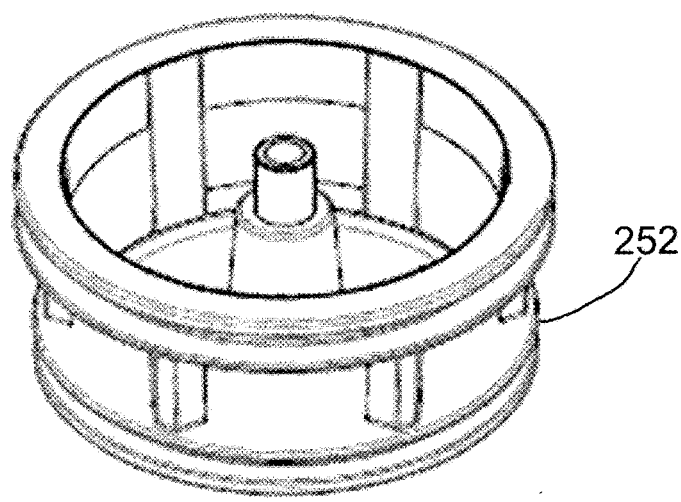
FIG. 22B is a front perspective view of a filter basket of the filter assembly shown in FIG. 17 according to an embodiment of the present invention.
Figure 22C:
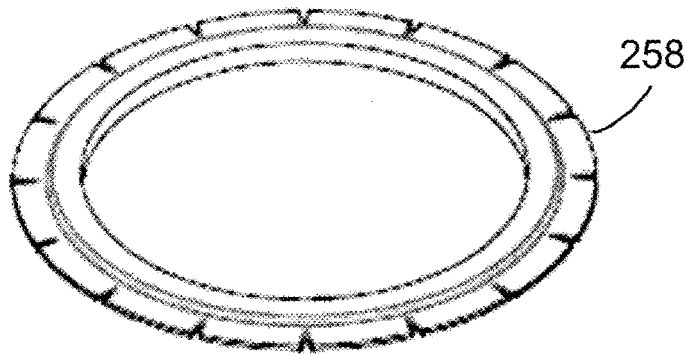
FIG. 22C is a front perspective view of a wiping seal of the filter assembly shown in FIG. 17 according to an embodiment of the present invention.
Figure 23:
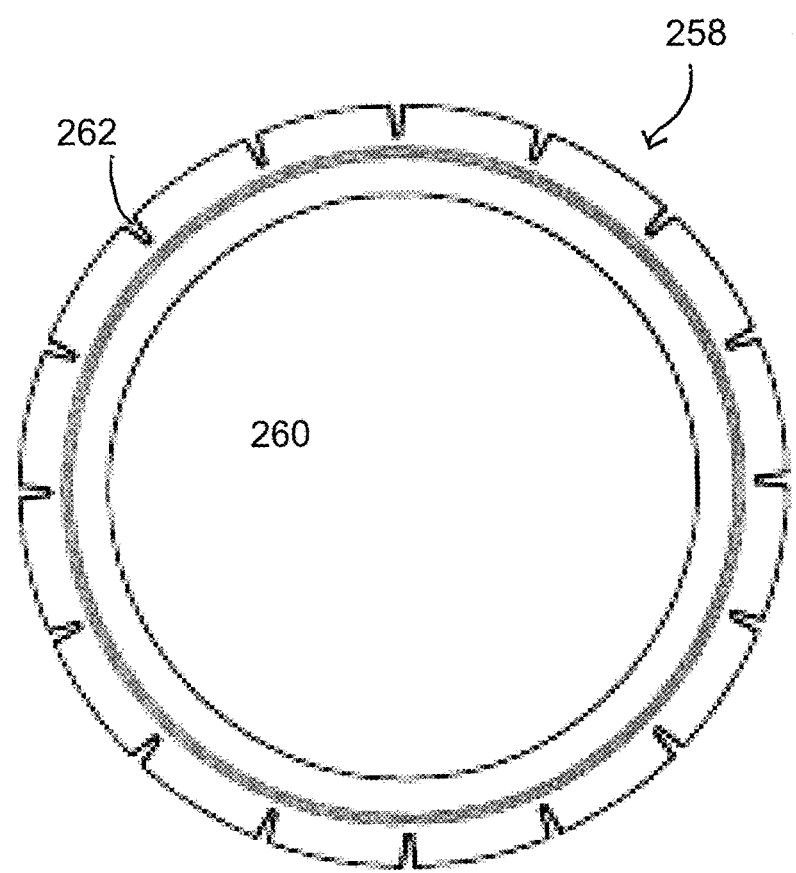
FIG. 23 is a top plan view of a wiping seal shown in FIGS. 21C and 22C according to an embodiment of the present invention.
Figure 24:
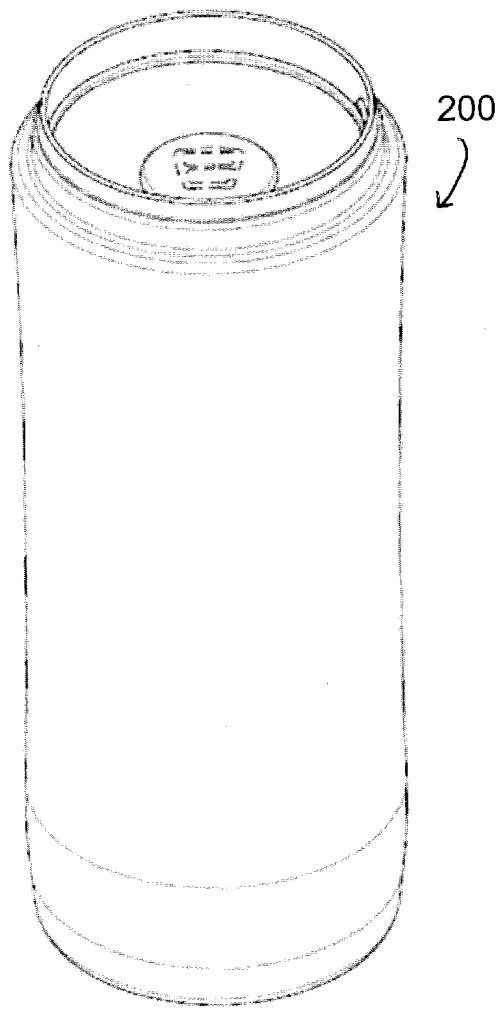
FIG. 24 is a front perspective view of the exemplary embodiment of a press shown in FIG. 14 (with cap removed).
Figure 25:
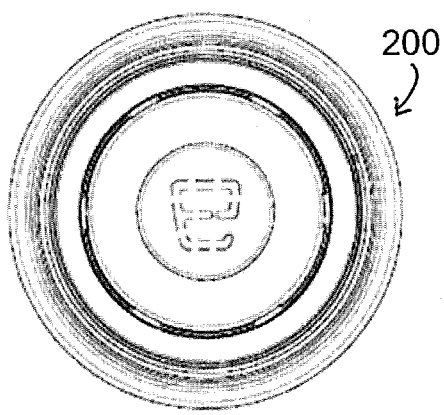
FIG. 25 is a top plan view of the press shown in FIG. 24 (with cap removed).
Figure 27A:
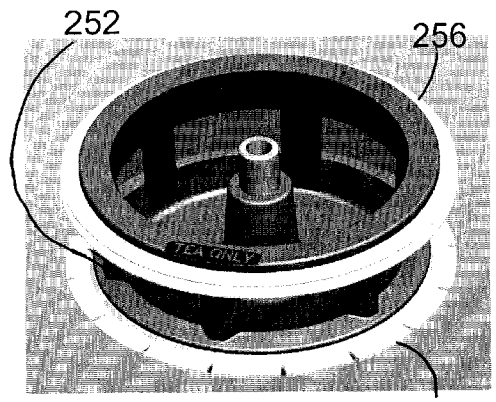
FIG. 27A is a top perspective view of another exemplary embodiment of a filter assembly for use in a press according to the present invention.
Figure 27B:
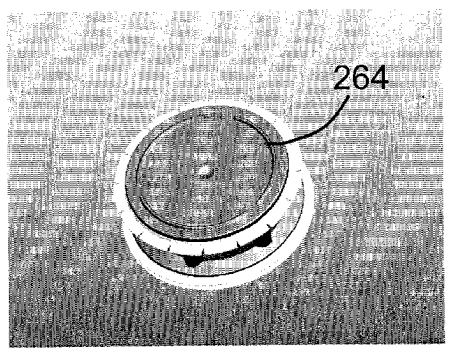
FIG. 27B is a bottom perspective view of the embodiment of the filter assembly shown in FIG. 27A.
Figure 27C:
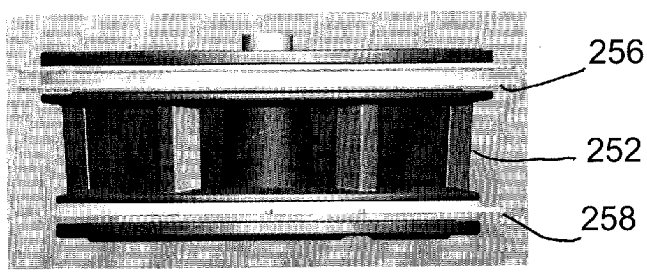
FIG. 27C is a front view of the embodiment of the filter assembly shown in FIG. 27A.
Figure 27D:
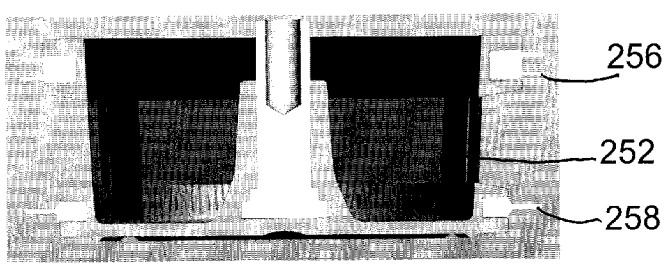
FIG. 27D is a front cross-sectional view of the embodiment of the filter assembly shown in FIG. 27A.
Figure 28A:
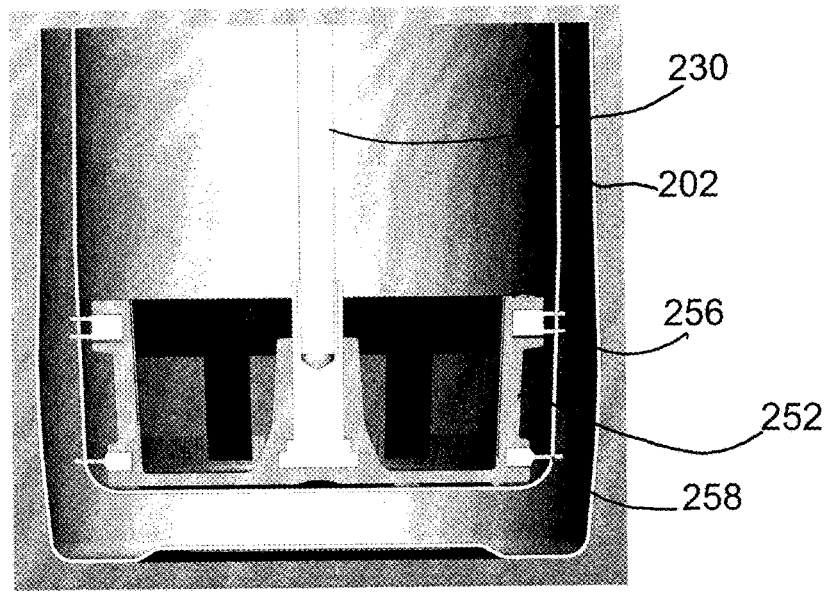
FIG. 28A shows another cross-sectional view of the embodiment of the filter assembly shown in FIG. 27A.
Figure 28B:
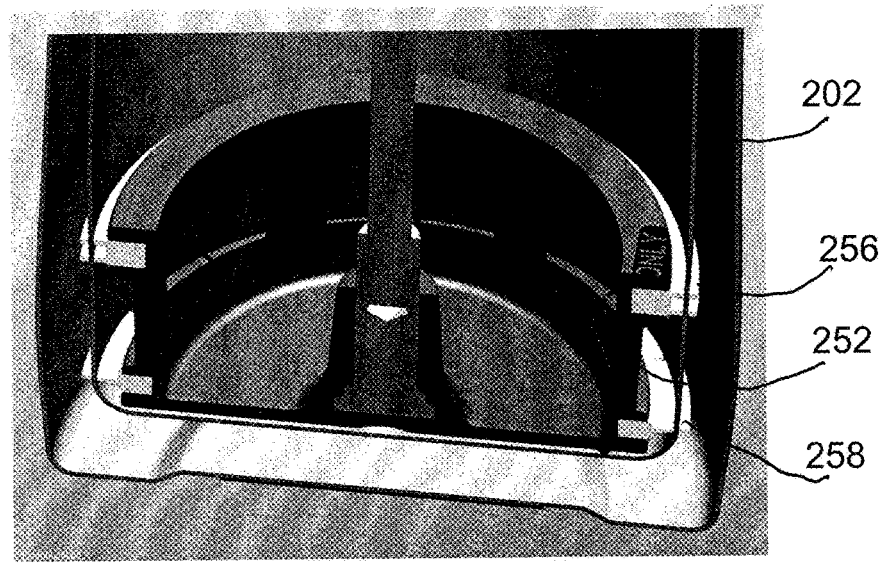
FIG. 28B shows a perspective cross-sectional view of the embodiment of the filter assembly shown in FIG. 27A.

A perspective view of a second embodiment of a press 200 is illustrated in FIG. 14, a front plan view is shown in FIG. 15, and a cross-sectional view is shown in FIG. 16. A top perspective view of the press 200 with the cap section removed is shown in FIG. 24 and a corresponding top view is shown in FIG. 25. This second embodiment 200 is advantageous for making tea as well as other beverages such as coffee, Yerba-Mate and the like. The outer vessel 202, upper 214 and lower cap portion 216, plunger handle 225 and plunger shaft 230 are the same as the first embodiment. However, the structure of the filter basket 235 is notably different from the filter assembly of the first embodiment described above. The plunger 230 and filter assembly 235 is depicted in FIGS. 17-23. The same double circumferential seal 256 is present as with the first embodiment. However, an immediately noticeable difference is that only one filter basket 252 is present with one filter formed on the walls of the filter basket. The filter basket 252 may include a 80-600 mesh and may provide a buffer between the infusible material and the extract. Instead of a second filter element, a segmented annular wiping seal 258 is provided to wipe along the sides of the vessel as the filter 235 is advanced toward the bottom of the vessel comprised of an annular member 260 with wedge shaped radial notches, e.g., 262, formed into its periphery. Applicant has found such a wiping structure to be effective in transporting tea leaves toward the bottom of the container. This permits the use of one main filter above the wiping seal 258 to filter the extract. The cuts 262 in the lower seal act like a first filter to reduce the load on the second filter 252, thereby reducing the amount of area needed in the second filter and/or enabling one to use a finer secondary filter for cleaner coffee or tea. The cuts in the lower seal 262 cooperate with the inner wall of the vessel, by staying open at the top where the container diameter is large to let through extract (and a very small amount of the leaves), and by closing at the bottom where the container diameter is smaller, to prevent extract from getting to the tea leaves and continuing to extract (over-extract) the tea. The shape of the cutouts may be straight-edged angular, or slight curved from the top view, as at the bottom of the container, the lip will be bent upward to close the slots.

As the wiping seal 258 is advanced toward the bottom of the vessel as the plunger 230 is depressed, the wedge-shaped serrations in the annular periphery of the wiping seal 258 close up due to the reduction in the diameter of the container (or wiping seal, as the seal advances into the lower part of the container). FIGS. 27A-D and 28A-B this embodiment of the filter assembly. Of particular significance, as set forth in FIG. 27B, a plurality of arcuate peripheral ridges 264 are provided on the bottom of the filter basket. This is done to permit the filter basket to sit flat, but also to help pinch down tea leaves in the bottom of the container, preventing fluid transfer from the infusible material into the extraction. As shown in the cross-sectional view of FIG. 28A, the inner wall 202 of the press 200 may slope inwardly toward the bottom, so that the bottom seal 258 curves up as it the filter assembly 235 is moved toward the bottom, forcing the slots 262 of the seal closed.

This pinching, and/or the wiping seal and/or the closing of the slots in the wiping seal 258 act to mechanically isolate the tea leaves from infused liquid after the press has been used to extract flavor from tea leaves. For example, tea is made using the device by placing desired tea leaves (whether one type of tea or a blend) in the vessel and adding hot water. After waiting a predetermined amount of time for the tea leaves to steep, the filter basket 252, plunger 230 and base portion of the cap 216 are attached to the lower vessel 202. The filter basket 252 is then advanced through the mixture of infusible material and infused liquid, leaving behind infused liquid. The tea leaves are then moved toward the bottom by the filter basket 252 and wiping seal 258. Mechanically isolating the used tea leaves then minimizes the effect that the residual tea leaves have on altering the taste of the infusion over time, such as if the press is placed in a vehicle for several hours. Thus, the present disclosure significantly provides systems and methods for separating infused liquids from used tea leaves.

Figure 29:
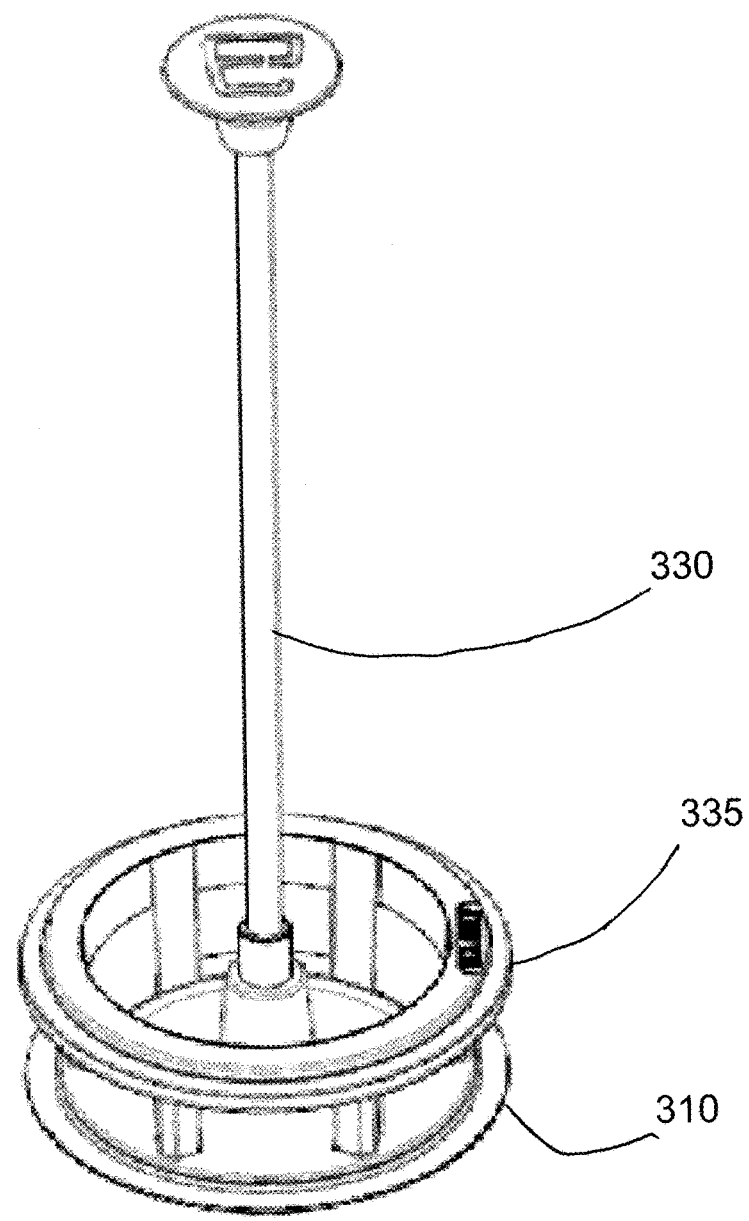
FIG. 29 is a cross-sectional view of another exemplary embodiment of a press according to the present invention.
Figure 30:
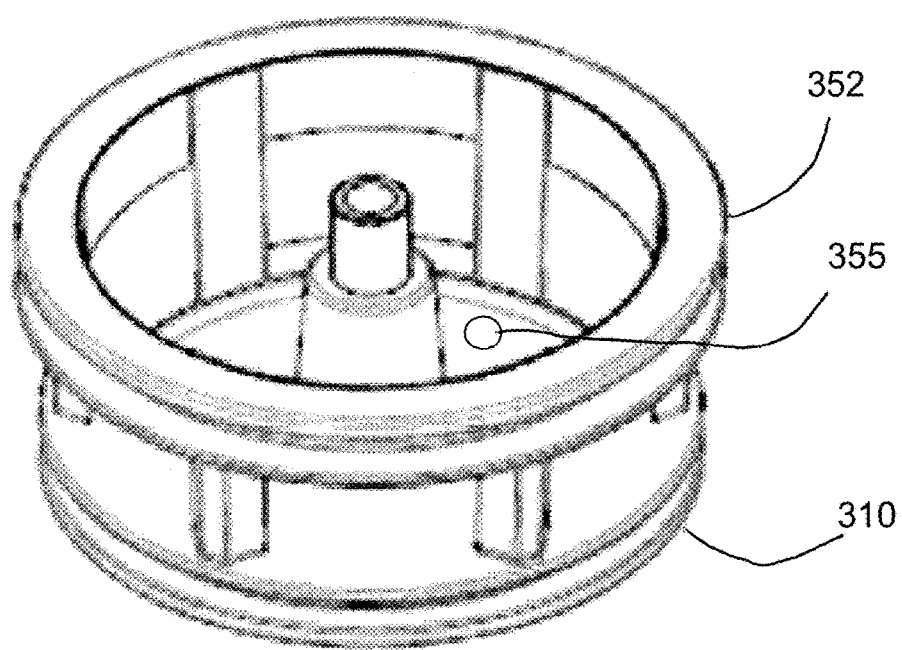
FIG. 30 is a cross-sectional view of another exemplary embodiment of a press according to the present invention.
Figure 31:
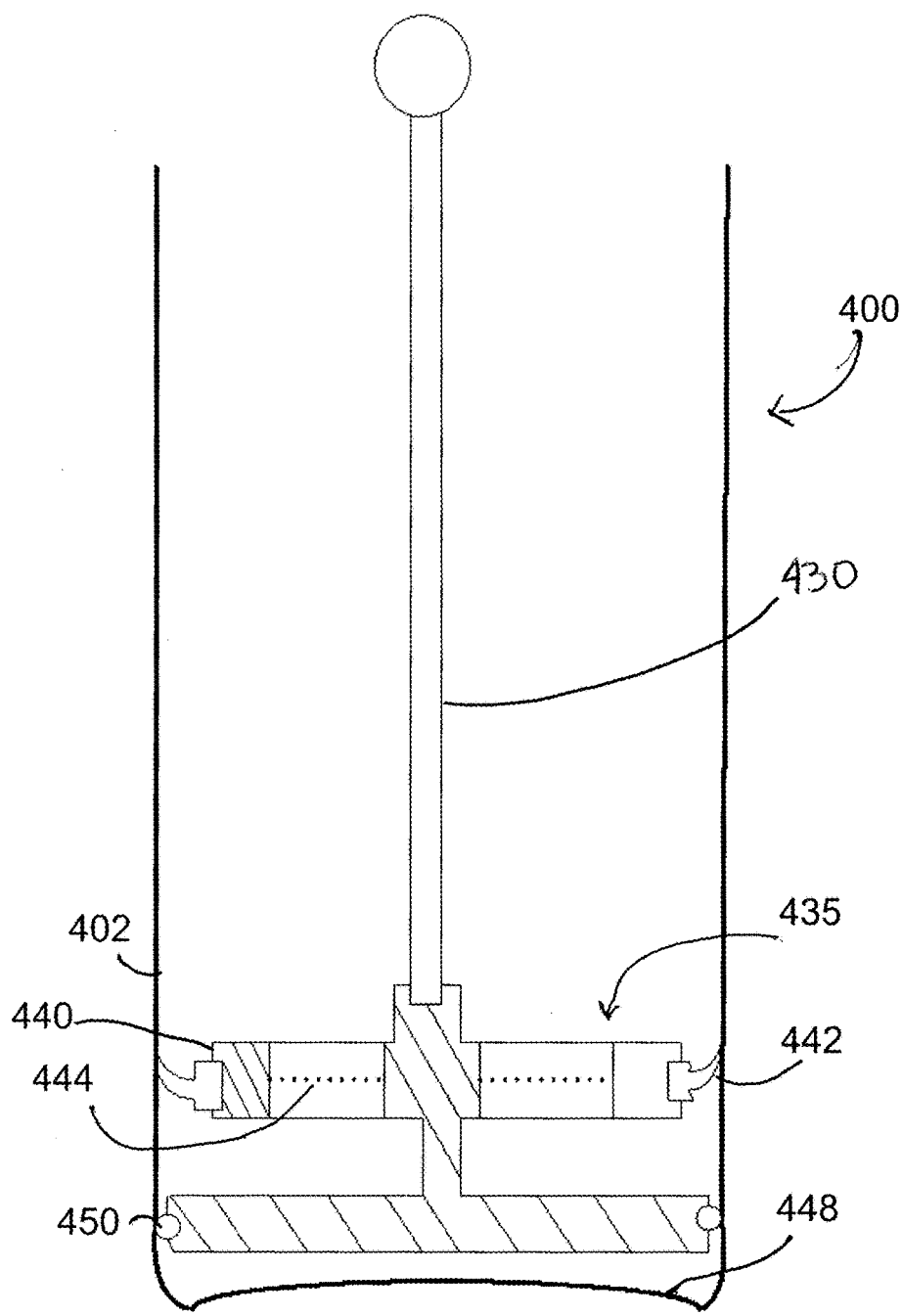
FIG. 31 is a cross-sectional view of another exemplary embodiment of a press according to the present invention.
Figure 33:
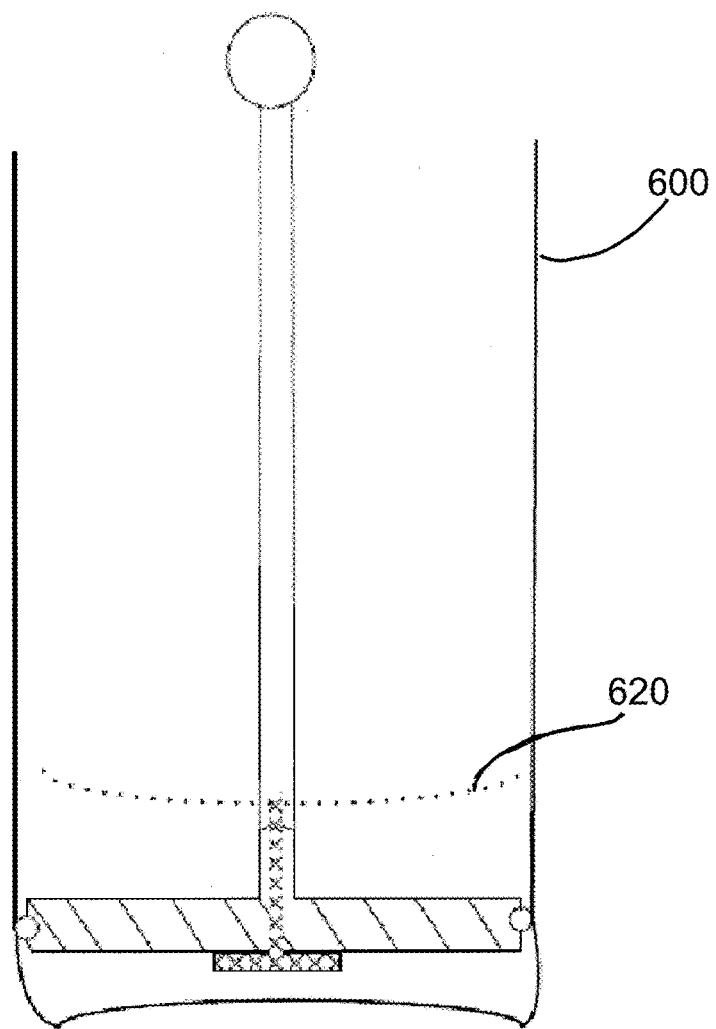
FIG. 33 presents yet a further embodiment in accordance with the present disclosure.

However, it will be appreciated that a variety of alternative embodiments can be practiced in accordance with the disclosure. For example, FIGS. 29 and 30 illustrate an alternative embodiment of a filter assembly 335 wherein the wiping seal 310 is not serrated and does not include notches. An objective of this embodiment is to pass liquid easily in the upper portion of the container, and then close firmly at the bottom. As illustrated in FIG. 30, a small through hole 355 can be used in the seal or the filter 335 to allow air into the volume under the filter, to allow the filter to be removed from the container without it becoming "stuck" to the bottom of the container. The material and thickness of the wiping seal 310 can be selected accordingly to be of more compliant material that will urge against the wall of the press, but remain substantially leak free. FIG. 31 illustrates an additional embodiment of a press 400 with a radiused bottom, such as one made from glass, wherein a filter structure 435 attached to a plunger 430 includes an upper disc portion 440 with a wiping seal 442 about its periphery (notched or unnotched) with filter media 444 formed in the disc. An o-ring 450 or other annular member is attached to the filter assembly to contact the radius of the base of the vessel, trapping tea leaves in the bottom of the vessel between a bottom face 448 of the filter structure, and an upwardly facing face of the inside of the press. A further variation of this embodiment 600 is presented in FIG. 33 in which a standard French press filter 620 may be used in place of an upper disc portion.

Figure 32:
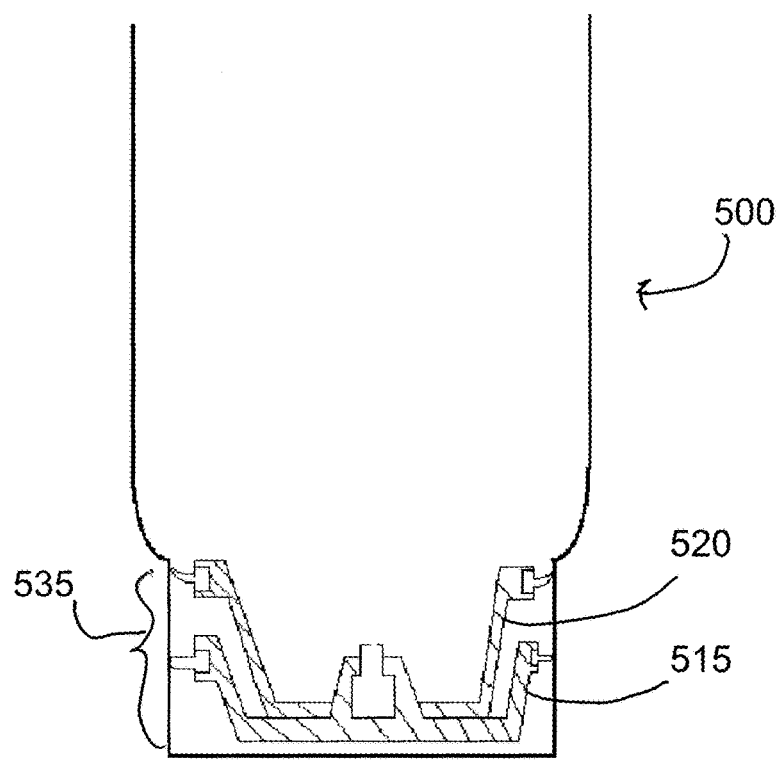
FIG. 32 presents an alternative embodiment in accordance with the present disclosure.

FIG. 32 presents an alternative embodiment 500 similar to the second embodiment, but with the following modifications. The double seal is moved to a lower filter basket 515, whereas the wiping seal 520 is moved to an upper location above the double seal. The filter media can be a single filter, or double filter, if desired, and can be located on horizontal and/or vertical surfaces of the filter structure 535.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for extracting an infusion comprising:
 a container for holding infused extract having a peripheral wall defining a volume therein, the peripheral wall defining an open top of the container;
 a plunger that interfits with the container to define and separate a lower chamber and an upper chamber, the plunger including:
  an elongate vertical handle;
  a basket filter attached to the elongate vertical handle, the basket filter including an upper annular frame and a lower annular frame connected by at least one filter disposed between the upper annular frame and the lower annular frame;
  an upper continuous peripheral seal attached to the upper annular frame, the upper continuous peripheral seal being configured to separate liquid below said upper continuous peripheral seal from liquid below said upper continuous peripheral seal; and
  a segmented annular mechanical seal attached to the lower annular frame, said lower annular frame being of a fixed circumference that is not adjustable, said segmented annular mechanical seal including sealing segments adapted to translate along said peripheral wall separated by radially inwardly formed gaps between said sealing segments, said segmented annular mechanical seal being configured to substantially prevent infusible material from reaching said at least one filter disposed between said upper annular frame and said lower annular frame, said segmented annular mechanical seal being configured to translate along an inner face of the peripheral wall in tandem with said upper continuous peripheral seal as the plunger is advanced from a top of the container toward a bottom of the container, wherein infused extract in said lower chamber passes between said sealing segments and said peripheral wall and through said at least one filter, and wherein sealing action of said upper continuous peripheral seal against said peripheral wall causes infused extract to be directed through said at least one filter after said infused extract passes said segmented annular mechanical seal as said plunger is advanced downwardly within said container.

2. The apparatus of claim 1, wherein the peripheral wall of the container includes a region of decreasing diameter.

3. The apparatus of claim 2, wherein the sealing segments of the segmented annular mechanical seal are configured to curve upwardly when the plunger is advanced downwardly into the region of decreasing diameter.

4. The apparatus of claim 1, wherein the plunger includes a plurality of ridges on a bottom thereof to help trap infusible material from liquid in the container.

* * * * *